United States Patent
Efland et al.

(10) Patent No.: US 12,112,535 B2
(45) Date of Patent: Oct. 8, 2024

(54) SYSTEMS AND METHODS FOR EFFECTING MAP LAYER UPDATES BASED ON COLLECTED SENSOR DATA

(71) Applicant: Lyft, Inc., San Francisco, CA (US)

(72) Inventors: Kris Richard Efland, Lafayette, CA (US); Nadha Nafeeza Gafoor, Sunnyvale, CA (US); Nastaran Ghadar, Pleasanton, CA (US); Amruta Kiran Kulkarni, Santa Clara, CA (US); Meng Tao, Redwood City, CA (US); Ziyi Zhao, Sunnyvale, CA (US)

(73) Assignee: Lyft, Inc., San Francisco, CA (US)

( * ) Notice: Subject to any disclaimer, the term of this patent is extended or adjusted under 35 U.S.C. 154(b) by 864 days.

(21) Appl. No.: 16/916,015

(22) Filed: Jun. 29, 2020

(65) Prior Publication Data
US 2021/0406559 A1    Dec. 30, 2021

(51) Int. Cl.
| | | |
|---|---|---|
| G06V 20/10 | (2022.01) | |
| G01C 21/00 | (2006.01) | |
| G06F 18/25 | (2023.01) | |
| G06V 10/80 | (2022.01) | |
| G06V 20/56 | (2022.01) | |

(52) U.S. Cl.
CPC ......... *G06V 20/10* (2022.01); *G01C 21/3822* (2020.08); *G01C 21/3841* (2020.08); *G01C 21/3859* (2020.08); *G06F 18/251* (2023.01); *G06V 10/803* (2022.01); *G06V 20/56* (2022.01)

(58) Field of Classification Search
CPC ...... G06V 20/10; G06V 20/56; G06V 10/803; G06V 10/56; G01C 21/3822; G01C 21/3841; G01C 21/3859; G06F 18/251
See application file for complete search history.

(56) References Cited

U.S. PATENT DOCUMENTS

| | | | | |
|---|---|---|---|---|
| 2018/0253424 A1* | 9/2018 | Banerjee | ............... | G06T 7/0002 |
| 2020/0263993 A1* | 8/2020 | Gaal | ................. | G01C 21/3691 |
| 2020/0363215 A1* | 11/2020 | Rusignola | ............ | G05D 1/0212 |
| 2021/0108926 A1* | 4/2021 | Tran | ....................... | G06T 17/05 |
| 2022/0343241 A1* | 10/2022 | Jha | ......................... | G08G 1/166 |

* cited by examiner

*Primary Examiner* — Casey L Kretzer
(74) *Attorney, Agent, or Firm* — Lee Sullivan Shea & Smith LLP

(57) ABSTRACT

Examples disclosed herein may involve a computing system configured to (i) maintain a map that is representative of a real-world environment, the map including a plurality of layers that are each encoded with a different type of map data, (ii) obtain sensor data indicative of a given area of the real-world environment, (iii) based on an evaluation of the obtained sensor data and map data corresponding to the given area, detect that a change has occurred in the given area, (iv) based on the collected sensor data, derive information about the detected change including at least a type of the change and a location of the change, (v) based on the derived information about the detected change, determine that one or more layers of the map is impacted by the detected change, and (vi) effect an update to the one or more layers of the map based on the derived information about the change.

18 Claims, 12 Drawing Sheets

SYSTEMS AND METHODS FOR EFFECTING MAP LAYER UPDATES BASED ON COLLECTED SENSOR DATA

BACKGROUND

Vehicles are increasingly being equipped with technology that allows them to monitor their surrounding environment and make informed decisions on how to react. These vehicles, whether autonomously driven, semi-autonomously driven, and/or manually driven, may be capable of sensing their environment and then safely navigating and driving with little or no human input, as appropriate. To help facilitate this functionality, such a vehicle may have an on-board computing system that is configured to perform functions such as localization, object detection, prediction, and path planning using a variety of data, including but not limited to sensor data captured by the vehicle and map data related to the vehicle's surrounding environment.

SUMMARY

In one aspect, the disclosed technology may take the form of a method that involves (i) maintaining a map that is representative of a real-world environment, the map comprising a plurality of layers, wherein each layer of the map is encoded with a different type of map data, (ii) obtaining sensor data that is indicative of a given area of the real-world environment, (iii) based on an evaluation of the obtained sensor data and map data corresponding to the given area, detecting that a change has occurred in the given area, (iv) based on the collected sensor data, deriving information about the detected change to the given area, wherein the derived information about the detected change to the given area includes at least a type of the change and a location of the change, (v) based on the derived information about the detected change, determining that one or more layers of the map is impacted by the detected change, and (vi) effecting an update to the one or more layers of the map based on the derived information about the change.

In some example embodiments, deriving information about the detected change to the given area may involve determining that the detected change is a temporary change, and the one or more layers of the map that is impacted by the detected change may include a real-time layer that is encoded with temporary map data.

Further, in example embodiments, the type of the change to the given area may include the addition of a new semantic feature to the given area of the real-world environment, and the one or more layers of the map data that is impacted by the detected change may include a semantic map layer that is encoded with semantic map data.

Further yet, in example embodiments, the method may also involve (i) after effecting the update to the one or more layers of the map based on the derived information about the change, collecting additional sensor data that indicates that the change has been removed from the given area, and (ii) based on an evaluation of at least the additional collected sensor data that indicates that the change has been removed from the given area, reverting the update to the one or more layers of the map.

Still further, in some example embodiments, the method may also involve (i) collecting additional sensor data that is indicative of the given area, (ii) based on the additional collected sensor data, determining at least one additional layer of the map that is impacted by the detected change, and (iii) effecting the update to the at least one additional layer of the map.

Still further, in some example embodiments, the method may also involve (i) after detecting that the change has occurred in the given area, requesting additional sensor data that is indicative of the given area, which may involve causing a sensor-equipped vehicle to traverse the given area, and (ii) based on requesting the additional sensor data, obtaining the additional sensor data, which may involve receiving the additional sensor data from the sensor-equipped vehicle, wherein effecting the update to the one or more layers of the map is based on the obtained additional sensor data.

Still further, in example embodiments, the collected sensor data may include 2D image data and the map data corresponding to the given area may include 2D reference images of the given area, and wherein the evaluation of (i) the obtained sensor data and (ii) the map data may involve (i) localizing the 2D image data in relation to the 2D reference images, and (ii) determining a delta between the 2D image data and the 2D reference images.

Still further, in example embodiments, obtaining sensor data that is indicative of a given area of the real-world environment may involve obtaining respective sensor data sets collected by two or more vehicles in the given area of the real-world environment, and the method may also involve (i) detecting the change in two or more of the respective sensor data sets, (ii) based on detecting the change in two or more of the respective sensor data sets, determining a confidence level associated with the change, (iii) wherein effecting the update to the one or more layers of the map is based on the determined confidence level exceeding a predetermined threshold.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1A:
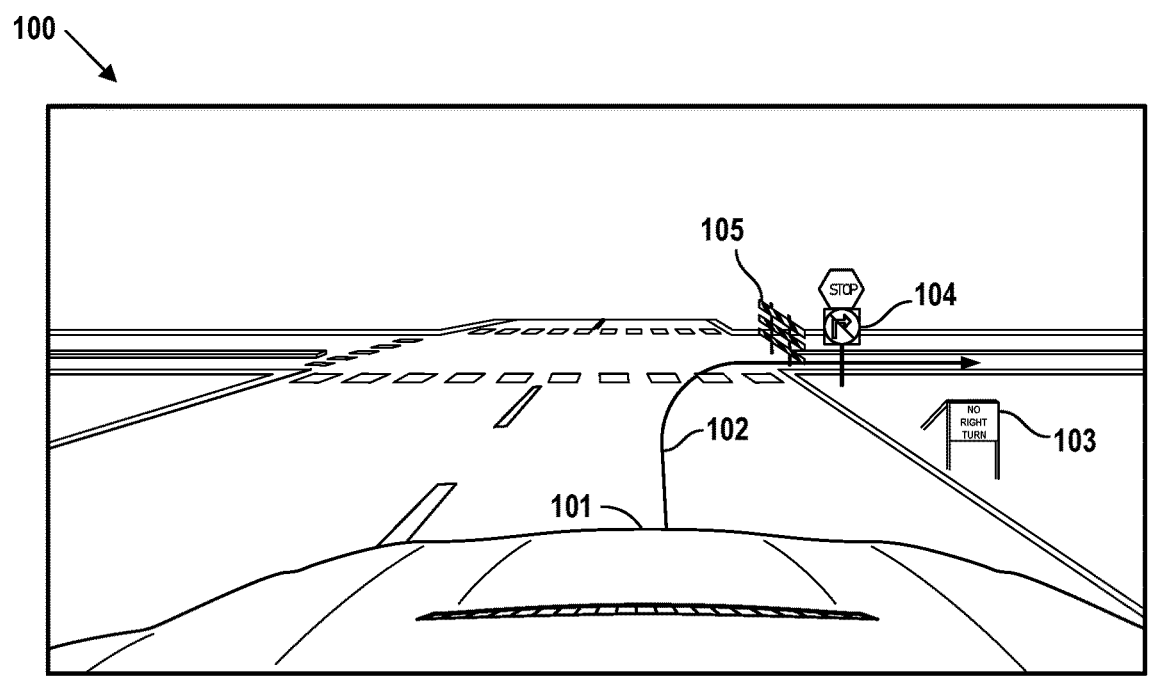
FIG. 1A is a diagram that illustrates one example of changes to a real-world environment that are not reflected in map data available to a vehicle.
Figure 1A:
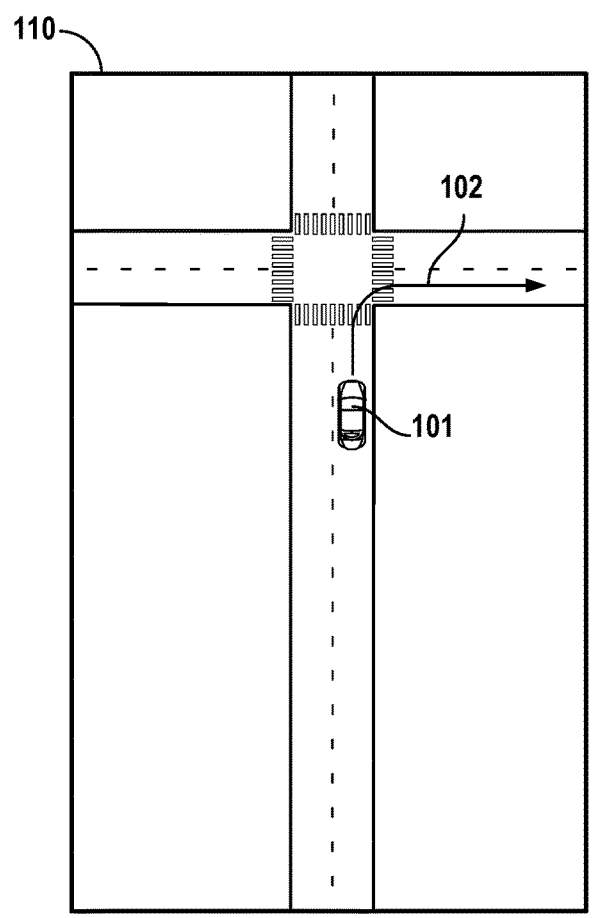

Vehicles are increasingly being equipped with technology that enables them to monitor their surrounding environment and perform certain tasks with little or no human input, as appropriate. For instance, such a vehicle may be equipped with (i) sensors that are configured to capture various types of sensor data that is representative of the vehicle's surrounding environment, (ii) an on-board computing system that is configured to perform functions that enable the ego vehicle to gain an understanding of its surrounding environment and then plan its behavior within that surrounding environment, and (iii) actuators that are configured to control the physical behavior of the vehicle, among other possibilities—which may collectively be referred to as the vehicle's "autonomy system." One possible example of a vehicle equipped with such technology may be a vehicle having some level of autonomous driving capability (e.g., a semi- or fully-autonomous vehicle), which may be referred to herein as an "autonomous vehicle" (or "AV" for short), although it should be understood that other types of vehicles could be equipped with aspects of this technology as well, including but not limited to vehicles equipped with advanced driver assistance systems (ADAS). For purposes this disclosure, a vehicle that is equipped with aspects of this technology may be referred to as an "ego vehicle."

In practice, when an ego vehicle is operating in a real-world environment, the ego vehicle's autonomy system may be configured to repeatedly iterate through a given sequence of operations that enable the ego vehicle to gain an understanding of its surrounding environment and then behave appropriately within that surrounding environment. For instance, the sequence of operations that is iteratively performed by an ego vehicle's autonomy system may begin with the autonomy system capturing sensor data that provides information regarding the current state of the environment in which the ego vehicle is operating, which may include (i) sensor data that provides information regarding the ego vehicle's surrounding environment, such as camera image data and/or Light Detection and Ranging (LiDAR) data (among other possibilities), and (ii) sensor data that provides information regarding the ego vehicle's location and/or movement within its surrounding environment, such as Global Positioning System (GPS) data and/or Inertial Measurement Unit (IMU) data (among other possibilities).

After capturing this sensor data, the autonomy system may perform a "localization" operation, which may generally involve analyzing the captured sensor data against a map of the geographic region in which the ego vehicle is located (e.g., a high-resolution map having centimeter-level precision) in order to determine the ego vehicle's position within that high-resolution map, which may then enable the autonomy system to use the map data encoded within the high-resolution map to establish a baseline understanding of the ego vehicle's surrounding environment. For example, the map data encoded within the high-resolution map may include road-network data that provides information regarding the road network within the geographic region, geometric data that provides information regarding the physical geometry of the geographic region (e.g., the geometry of the ground surfaces within the geographic region), semantic data that provides information regarding semantic elements within the geographic region (e.g., lanes, traffic lights, traffic signs, crosswalks, etc.), and behavior data that provides information regarding observed prior behavior within the geographic region (e.g., prior trajectories of agents such as vehicles, cyclists, and pedestrians), among other possibilities.

Next, the autonomy system may perform a "perception" operation, which may generally involve analyzing the captured sensor data along with the map data for the ego vehicle's surrounding environment in order to detect objects within the ego vehicle's surrounding environment and derive certain information about each of the detected objects (e.g., an object's class, position, orientation, speed, and/or acceleration).

In turn, the autonomy system may perform a "prediction" operation, which may generally involve analyzing the information derived during perception along with the map data for the ego vehicle's surrounding environment in order to predict the future behavior of each of the detected objects (e.g., an agent's future trajectory).

Following the perception and prediction operations, the autonomy system may then perform a "planning" operation, which may generally involve analyzing the information derived during perception and prediction along with the map data for the ego vehicle's surrounding environment in order to derive a behavior plan for the ego vehicle, which defines the desired driving behavior of the ego vehicle (e.g., the ego vehicle's trajectory) for some future period of time (e.g., the next 5 seconds).

Lastly, the autonomy system may perform a "control" operation, which may generally involve transforming the derived behavior plan for the ego vehicle into one or more control signals (e.g., a set of one or more command messages) for causing the ego vehicle to execute the derived behavior plan, such as control signals for causing the ego vehicle to adjust its steering in a specified manner, accelerate in a specified manner, and/or brake in a specified manner, among other possibilities. In addition or in alternative to using the derived behavior plan to generate such control signals, it is possible that the derived behavior plan could also be presented to a human driver of the ego vehicle in order to assist with operation of the ego vehicle.

As noted above, an ego vehicle's autonomy system may be configured to iterate through this sequence of operations in a repeated manner as the ego vehicle continues to operate in the real-world environment, such as many times per second, so that the ego vehicle is able to continually update both its understanding of the surrounding environment and its planned behavior within that surrounding environment.

Based on the foregoing, it will be appreciated that providing ego vehicles such as AVs with access to accurate, up-to-date maps plays a critical role in enabling those ego vehicles to operate safely and efficiently in the real world. Indeed, once an autonomy system is able to localize an ego vehicle within a map, the autonomy system may then be able to use that map to access precomputed baseline information (i.e., encoded knowledge) about the ego vehicle's environment that is generally considered to have a high level of accuracy, which reduces the need for the autonomy system to derive this baseline information in real time. In this way, the map may significantly reduce the computational burden of an ego vehicle's autonomy system while also enhancing the reliability of the perception, prediction, and planning operations performed by the ego vehicle's autonomy system.

It should also be understood that maintaining accurate, up-to-date maps can play an important role in other technology areas as well. For instance, a map may be used by a transportation-matching platform to perform various tasks related to matching individuals interested in obtaining transportation (i.e., "transportation requestors") with vehicles that can provide such transportation.

As one example, a transportation-matching platform may utilize a map to generate routes for a vehicle to follow—both for the vehicle to pick up a requestor as well as for the vehicle to then transport the requestor to a desired location. In this regard, having accurate, up-to-date map data may allow the transportation-matching platform to generate routes that avoid road closures or areas of congestion, or indeed, areas where there is likely to be congestion based on historic driving information that may be encoded within the map. Accurate, up-to-date map data may facilitate effective route generation in other ways as well.

As another example, the transportation-matching platform may utilize a map to determine estimated times of arrival (ETAs) of vehicles in a more reliable way. Similar to route generation, this may include determining an ETA for a vehicle to pick up a requestor, as well as an ETA for the requestor's arrival at the desired location. For instance, travel times may be affected by speed limits along the generated route, the cycle times of traffic signals along the route, and/or predicted congestion based on prior agent trajectories, among other factors, each of which may be obtained by the transportation-matching platform from the map and factored into an ETA determination.

As yet another example, the transportation-matching platform may utilize a map to more effectively pre-position vehicles in anticipation of responding to transportation-matching requests, and can thereby improve its transportation-matching services even when the vehicles are not engaged in transportation of a requestor. For instance, having accurate, up-to-date map data may allow a vehicle to be positioned at an advantageous location that allows it to more easily and quickly reach an area that is anticipated to have a high number of transportation requestors, avoiding road closures and the like. In this regard, the transportation-matching platform may provide an indication of the advantageous location to a human driver of a vehicle, perhaps in conjunction with a planned route to reach the location.

Numerous other advantages associated with maintaining accurate, up-to-date maps are also possible.

However, maintaining accurate, up-to-date maps is a challenging task, particularly at scale, as there are a multitude of factors that can result in changes in the real world and thereby cause existing map data to become outdated. The types of changes in the real world that may affect the accuracy of map data may take various forms. For example, a temporary change within a given area of the real world, such as a construction zone that fully or partially obstructs a roadway, may affect the accuracy of map data for the given area for at least some temporary period of time. As another example, various objects in the real world that are represented within a map may change seasonally (e.g., trees), causing their representations within the map to diverge from their changed real-world appearance, and perhaps also causing the appearance (i.e., visibility) of other surrounding objects to change as well. As yet another example, permanent changes may occur within a given area of the real world, such as new lanes, traffic lights, signage, or other features, which may cause map data for the given area to become outdated and thus inaccurate. Other types of changes to the real-world environment that affect the accuracy of map data are also possible.

Changes such as these, and others, can result in the map data becoming outdated, or "stale," which can have negative impacts on tasks that are performed using the map data, as shown in the following FIGS. 1A-1C.

FIG. 1A depicts a forward-facing view from a vehicle 101 as it approaches an intersection in a real-world environment 100. Further, FIG. 1A includes a corresponding top-down visualization 110 of the current map data for a portion of the map, within which vehicle 101 has been localized. Vehicle 101 may be an ego vehicle as discussed above, and may have used the map data to derive a planned trajectory, represented by an arrow 102, that involves making a right turn at the intersection. Additionally or alternatively, vehicle 101 may be operating as part of a transportation-matching platform that generated a planned route, represented by arrow 102, for vehicle 101 to follow in order to pick up or drop off a requestor.

However, as can be seen in the top frame of FIG. 1A, vehicle 101 is unable to make a right turn due to a construction zone on its planned route, which was not reflected in the map data. This can lead to several disadvantages. First, an autonomy system of vehicle 101, if one is present, will need to detect and accurately identify numerous objects, including a road barricade 105 and turn restriction signage 103 and 104 (among other possibilities such as traffic cones, traffic posts, other construction signage, etc.) in real time and then adjust its prediction and planning operations accordingly, all without any corroborating information from the map data. Second, vehicle 101 may now be forced to determine an alternate route to bypass the construction zone, which may involve backtracking or other inefficiencies. Third, any ETA that vehicle 101 and/or a transportation-matching platform may have determined for following planned route 102 may now be inaccurate, and may require updating to incorporate delays that result from the re-routing. As discussed above, this might involve an ETA for vehicle 101 to arrive at a requestor's drop-off location or at a requestor's pick-up location. In this regard, vehicle 101 may have been pre-positioned with the aim of quickly and efficiently responding to an anticipated transportation-matching request from a location that has a high request frequency (e.g., an airport) based on an assumption that route 102 could be followed. Because this assumption proved to be incorrect, the vehicle's pre-positioning turned out to be disadvantageous for responding to the transportation-matching request in a quick and efficient way.

On the other hand, if the current map data available to vehicle 101 or the transportation-matching platform had incorporated an indication of the construction zone, vehicle 101 may have avoided some or all of the disadvantages noted above by accounting for the construction zone in its planning. For instance, vehicle 101 or transportation-matching platform may have determined an alternative route for vehicle 101 to follow that involved turning right at the previous intersection. Further, any ETA that is determined might be more reliable, as the determined route may not be subject to unforeseen obstacles. Still further, in a situation where vehicle 101 is being pre-positioned to respond to transportation-matching requests, vehicle 101 or transportation-matching platform may select a pre-positioned location that avoids the construction zone. Other benefits that may arise from the indication of the construction zone being incorporated within the map data are also possible.

In some situations, map data for a given area of the real world may also differ from the actual physical characteristics of the given area to such an extent that it may not even be possible to localize vehicle 101 within the map for the given area. Indeed, if the construction zone shown in FIG. 1A constitutes a substantial enough change to the physical characteristics of the real-world environment, the sensor data captured by vehicle 101 and analyzed as part of the vehicle's localization operation may not sufficiently correlate to map data that lacks the construction zone, resulting in a localization failure.

Figure 1B:
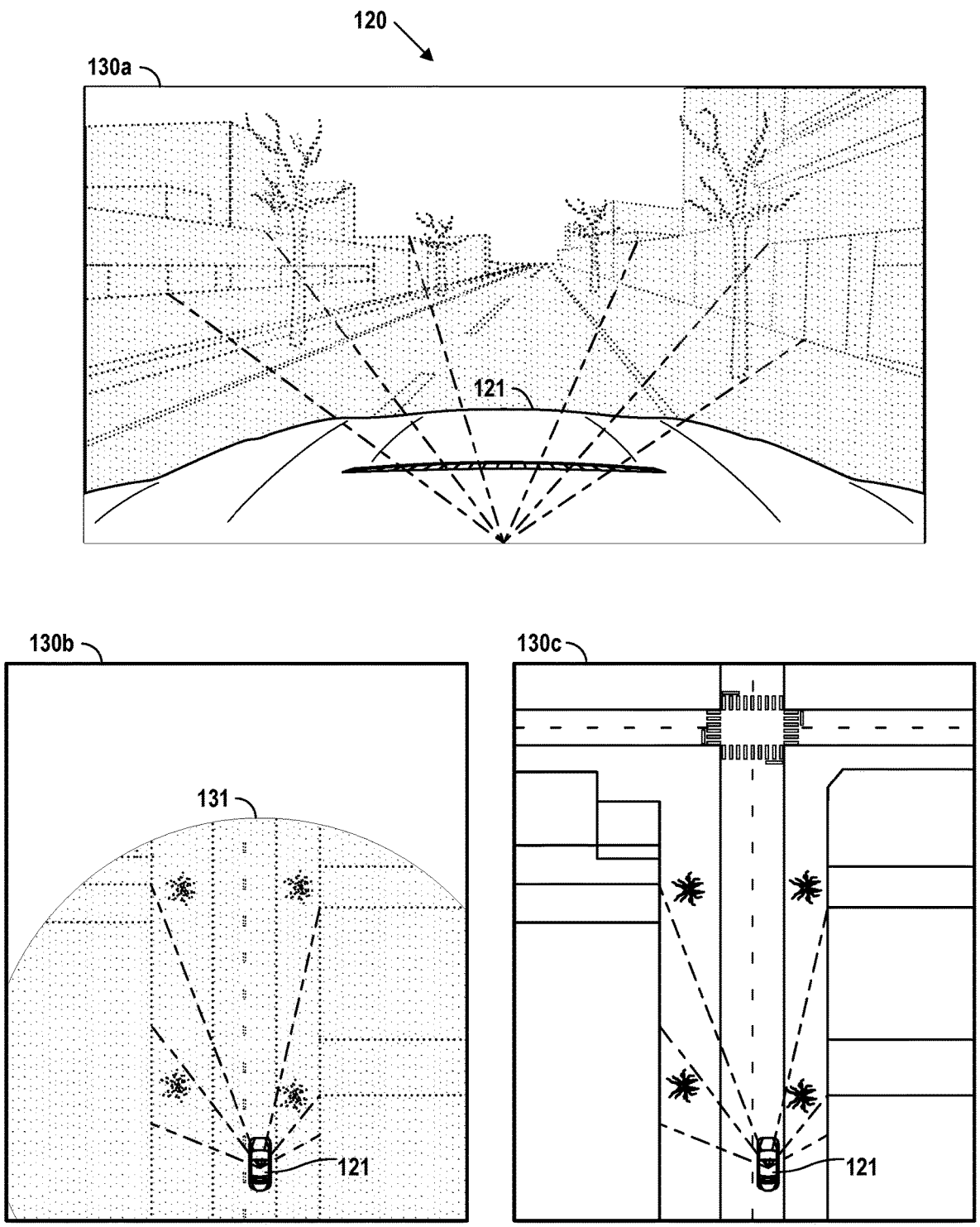
FIG. 1B is a diagram that illustrates one example of successful vehicle localization with respect to available map data for a real-world environment.
Figure 1C:
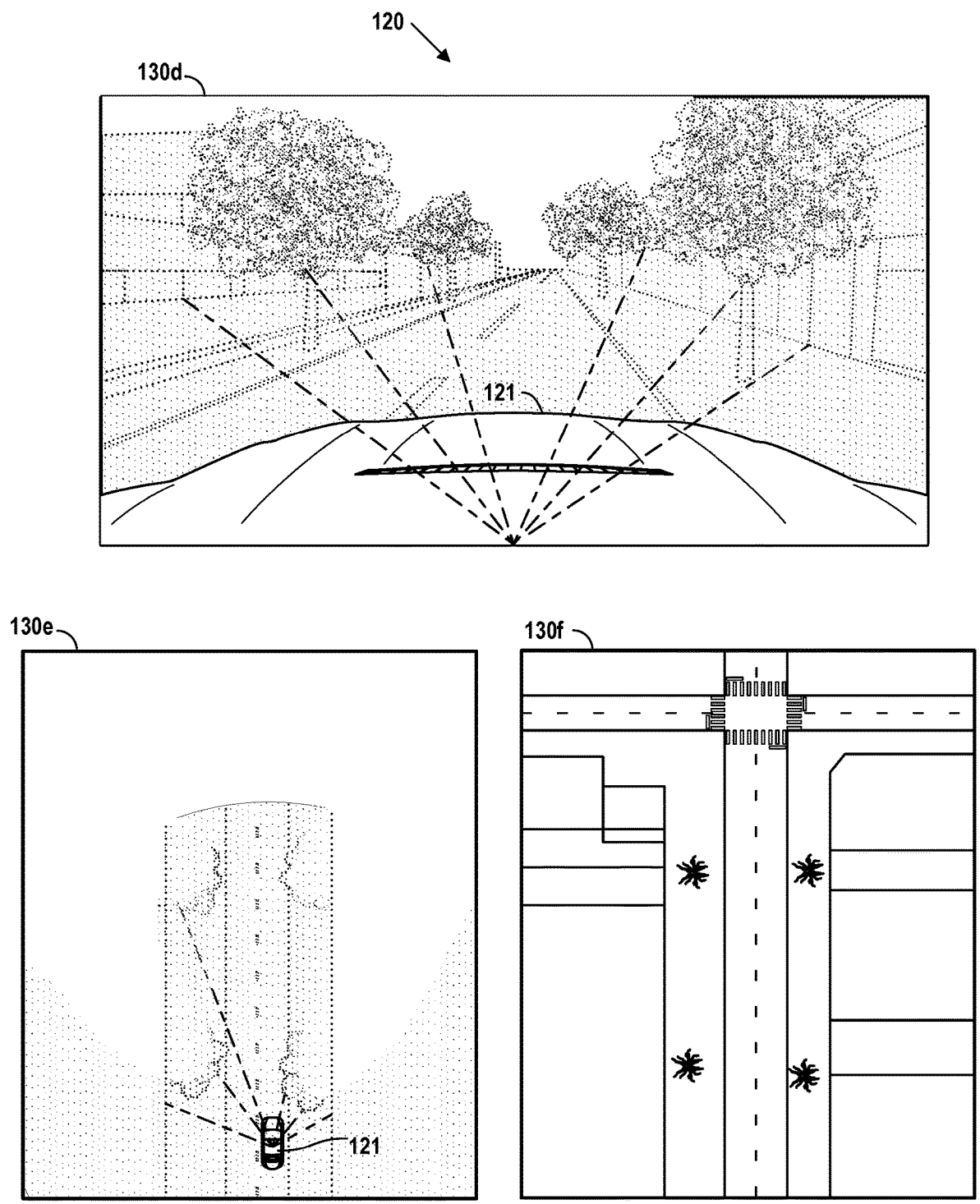
FIG. 1C is a diagram that illustrates one example of a failure of vehicle localization with respect to available map data based on changes to the real-world environment.

One example of a successful localization and a corresponding localization failure that results from unmapped changes to the real-world environment can be seen by contrasting FIG. 1B and FIG. 1C. A successful localization can be seen in FIG. 1B, which depicts in a first frame a visualization 130a of 3D sensor data from a forward-facing perspective of vehicle 121 operating in a real-world environment 120. As shown, vehicle 121 may capture LiDAR data that provides a 3D representation of the spatial properties (e.g., shape, location, etc.) of various features within real-world environment 120 from the perspective of vehicle 121. Accordingly, the top frame of FIG. 1B shows several example LiDAR rays originating from vehicle 121.

FIG. 1B also shows, in a second frame, a corresponding top-down visualization 130b of the same 3D sensor data captured by vehicle 121 operating in real-world environment 120. Further, the same example LiDAR rays are shown originating from vehicle 121. However, at the point in time depicted in the first and second frames of FIG. 1B, vehicle 121 is not yet localized within the map data that is available to vehicle 121 for real-world environment 120. Accordingly, the information available to vehicle 121 about its surroundings may be limited to data its sensors can collect, as shown by the arc 131 illustrating the limited range of the vehicle's sensors.

As vehicle 121 collects sensor data within real-world environment 120, the localization operation of vehicle 121 may correlate the collected sensor data to available map data in order to localize vehicle 121 within the map. For example, the captured LiDAR data (along with other captured sensor data) shown in FIG. 1B can be processed using a technique such as Simultaneous Localization and Mapping (SLAM) and then correlated to a 3D representation of real-world environment 120 embodied in the map using one or more matching algorithms. This process of correlating the processed sensor data to the corresponding map data as a reference is sometimes referred to as "snapping" the processed sensor data to the map data.

FIG. 1B also includes a third frame depicting a top-down visualization 130c of the map data that is available to vehicle 121. Referring again to visualizations 130a and 130b of the captured 3D sensor data, it will be appreciated that the LiDAR data captured by vehicle 121 can be correlated to the available map data with a relatively high degree of confidence. For instance, each of the example LiDAR rays shown in visualizations 130a and 130b intersects a point on an object in real-world environment 120 that is represented in the map data (e.g., at or near the same distance, angle, and elevation from vehicle 121). Accordingly, vehicle 121 can successfully localize itself in relation to everything else in the map, as shown in visualization 130c.

Successful localization may provide numerous benefits. For example, although the upcoming intersection shown in FIG. 1B may be beyond the normal range of the vehicle's sensor systems, vehicle 121 may have access to an accurate representation of the intersection, including all associated information that is contained within the map, by virtue of its successful localization. Further, the map data may include additional information that is not otherwise capturable by the vehicle's sensor system, as discussed above. For example, map data 130 may be encoded with an indication of prior trajectories of pedestrians that tend to cross the road at a certain location in the middle of the block with a relatively high frequency. Access to this type of information may assist vehicle 121 in predicting the future trajectories of detected objects and planning its own behavior. Numerous other advantages associated with successful localization within the map data are also possible.

However, map data that is available to vehicle 121 in FIG. 1B may have been created based on sensor data that was captured for real-world environment 120 during a time when the trees seen in the area were relatively undergrown and/or leafless. These physical characteristics of real-world environment 120 could subsequently change for various reasons (e.g., as the seasons change), which can make localization based on the outdated map data more difficult.

Turning to FIG. 1C, a first frame depicts a visualization 130d of 3D sensor data from another forward-facing perspective of vehicle 121 operating in real-world environment 120. As above, vehicle 121 may capture LiDAR data that provides a 3D representation of real-world environment 120. However, each of the trees is now full of leaves, which obstructs a substantial portion of real-world environment 120 that was formerly visible to vehicle 121. A similar result can also be seen in the second frame of FIG. 1C, which shows a corresponding top-down visualization 130e of the same 3D sensor data captured by vehicle 121 operating in real-world environment 120.

Because of the changes to real-world environment, the map data available to vehicle 121 is now outdated, which can be seen in the top-down visualization 130f of the map data shown in the third frame of FIG. 1C. As a result, there may be far less correlation between the captured sensor data and the representation of real-world environment 120 that is embodied in the map data. For instance, many of the captured LiDAR points that could formerly be correlated with features in the available map data are not captured in the example shown in FIG. 1C. Rather, as can be seen with reference to the example LiDAR rays, the newly captured LiDAR points may indicate physical characteristics (e.g., leaves) that are not reflected in the available map data. Thus, the vehicle's localization operation may be unable to determine the vehicle's position within the map with a sufficient degree of confidence, which may result in a localization failure.

Such a localization failure gives rise to several drawbacks. As one example, because of this localization failure, vehicle 121 may not be able to use the map data to assist in performing operations such as perception, prediction, and planning, and thus these operations may need to be carried out based solely upon the vehicle's collected sensor data. One aspect of this limitation can be seen in the top-down visualization 130e of FIG. 1C, as well as the top-down visualization 130b of FIG. 1B, where the vehicle's perception of real-world environment 120 is limited to the range of its sensor system, beyond which additional map data is unavailable. Further, vehicle 121 may no longer have access to observed prior behaviors or other useful information that may be encoded within map data 130 that could otherwise be used to further improve the accuracy of the perception, prediction, and/or planning operations.

In order to address these and other problems that arise from having outdated maps, disclosed herein is a flexible framework for generating timely, intelligent updates to maps based on the detection of changes in the real world.

As a starting point, the disclosed framework may maintain various maps that each generally represent, at the highest level, a collection of predetermined knowledge about a given area within the real world. This knowledge is encoded into the map as map data that may be assembled in layers, each of which contributes a different type of information to the map. In this respect, for each real-world location represented within the map, there may be map data encoded at multiple different layers of the map that provides different types information about that real-world location.

The different types of map data that may be included in these layers may take various forms, examples of which may include (i) road-network data that provides information regarding the road network found at a real-world location, (ii) geometric data that provides information regarding the physical geometry of the real-world location (e.g., the physical geometry of the ground and any other objects found at that real-world location), (iii) semantic data that provides information about semantic elements found at the real-world location (e.g., lanes, traffic lights, traffic signs, etc.), (iv) "priors" data that provides information about observed prior behavior at the real-world location (e.g., prior vehicle trajectories that have been observed within one or more lanes found at the real-world location), and (v) real-time data that provides real-time information about the real-world location (e.g., current traffic conditions). Numerous other layers and types of map data are also possible.

Figure 2:
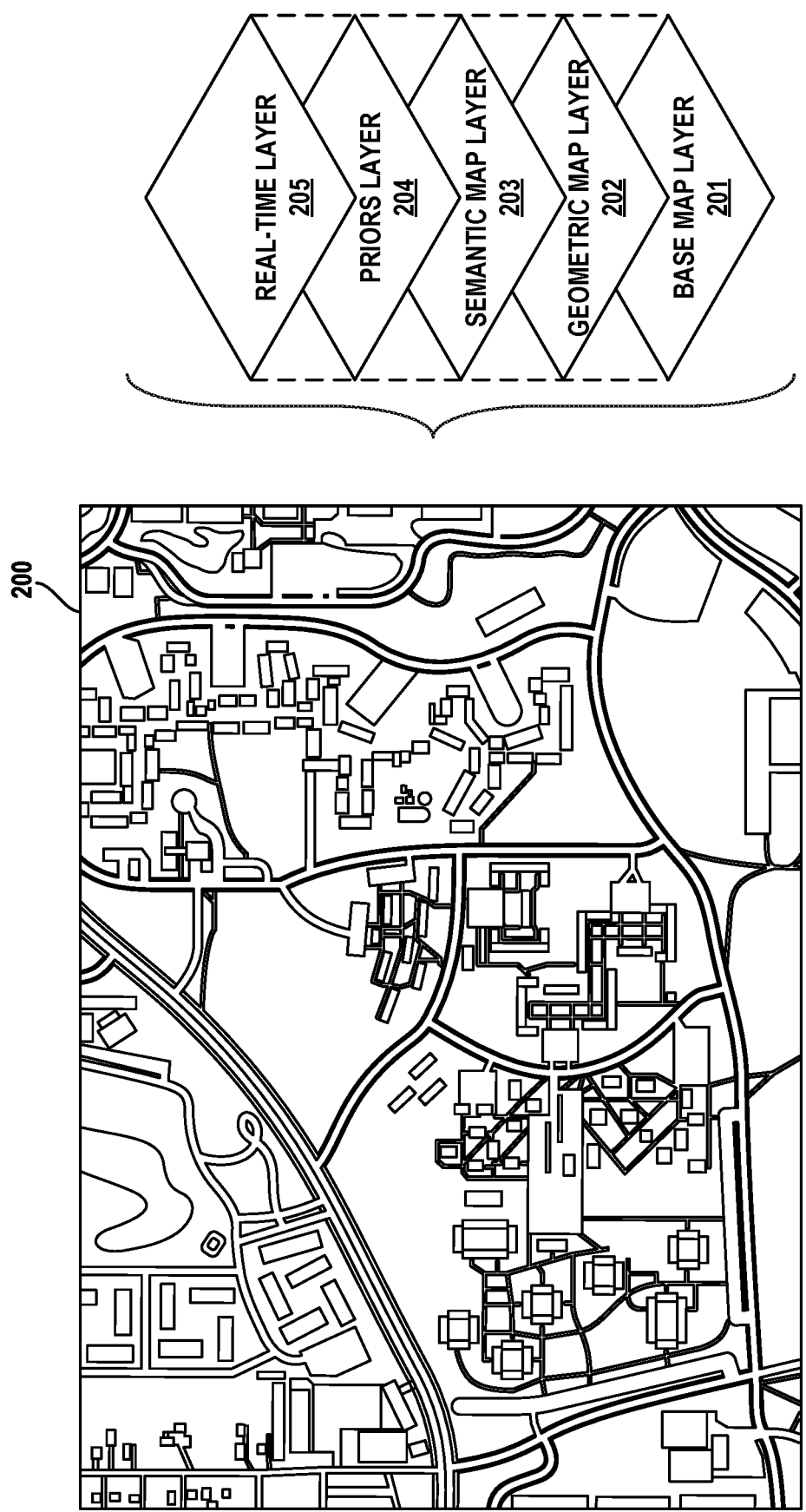
FIG. 2 is a diagram that illustrates an example map of a real-world environment that is comprised of several layers of map data.

As one illustrative example, FIG. 2 shows a visualization of a map 200 of the type that may be maintained and updated by the framework disclosed herein. As shown in FIG. 2, the map 200 corresponds to given area of the real world and is made up of several different layers that each contain different information about the real-world environment. Each layer is aligned to a common reference frame and may be indexed in such a way that allows for more efficient categorization and retrieval of the different types of map data contained therein, among other benefits. For instance, the organization of map data into layers as shown may allow for more efficient parallel lookups of information that is contained on different layers.

At the "bottom" layer, the map 200 may include a base map layer 201 that provides information about the basic road network on which a vehicle may drive. For example, the base map layer 201 may provide information regarding the location of road segments in the real-world environment, how they inter-connect, and the number and direction of lanes in each road segment. The base map layer 201 may generally correspond to the types of web-based map services that are generally available today and used by human drivers (e.g., via a smartphone) for turn-by-turn navigation.

The map 200 may also include a geometric map layer 202, which may generally provide information regarding the physical geometry of the real-world environment. For instance, geometric map layer 202 may contain a 3D representation of the physical geometry of the ground surface, which may be referred as the "ground map," as well as a 3D representation of the physical geometry of other objects within the real-world environment, such as tollbooths, buildings, trees, and the like. In practice, these 3D representations may be broken down into segments, which may be referred to as "voxels." Further, in practice, the geometric map layer 200 may define the common reference frame that is used to align all of the other layers of the map 200.

Notably, the geometric map layer 202 may provide a representation of the real-world environment that is orders of magnitude more precise than the representation provided by the base map layer 201. For example, while the base map layer 201 may represent the location of the road network within the real-world environment at an approximately meter-level of precision, which is generally not sufficient to support autonomous vehicle operation, the geometric map layer 202 may be able to represent the location of the road network within the real-world environment at a centimeter-level of precision.

Building from the geometric map layer 202, the map 200 may further include a semantic map layer 203 that includes data objects for semantic elements that are found within the real-world environment (i.e., "semantic objects"), which may be embedded with semantic metadata indicating information about such semantic elements. For example, the semantic map layer 203 may include semantic objects for lane boundaries, crosswalks, parking spots, stop signs, traffic lights and the like, each of which includes semantic metadata that provides information about the classification of the semantic element, the location of the semantic element, and perhaps also additional contextual information about the semantic element that can be used by a vehicle to drive safely and effectively. A semantic object for a traffic lane within the semantic map layer 203, for instance, may include an indication of a speed limit (and changes to the speed limit) at different points along the lane, turning restrictions for the lane at a given intersection, and an indication of which traffic signals control the lane. Similarly, a semantic object for a traffic signal within the semantic map layer 203 may include an indication of the lane(s) controlled by the traffic signal, turning restrictions that may be associated with the traffic signal, among other possibilities.

Each object within the semantic map layer 203 may be aligned with the geometric map layer 202 with a high degree of precision. In this regard, many of the semantic objects contained within the semantic map layer 203 may also be represented by the geometric model of the real-world environment contained within the geometric map layer 202. For instance, the geometric map layer 202 may contain a set of 3D points that represent a physical geometry of a given traffic signal. However, the semantic metadata for the traffic signal, as discussed above, is contained within a corresponding traffic signal object that exists within the semantic map layer 203.

This distinction highlights one of the advantages of segregating different types of map data (even if such data is related to the same object) into different map layers. For instance, different aspects of an ego vehicle's autonomy operation may reference the given traffic signal within the map 200 for different purposes. First, the ego vehicle's localization operation may reference the set of 3D points that represent the traffic signal (amongst other elements within the real-world environment) when it is attempting to determine the ego vehicle's location within the map 200, and the semantic metadata associated with the traffic signal and other semantic objects may be irrelevant for this process. Thus, the ego vehicle's localization operation can generally limit its analysis to information within the geometric map layer 202. On the other hand, once the ego vehicle's position has been determined with the map 200, the ego vehicle's perception, prediction, and planning operations may reference the semantic metadata of the traffic signal within the semantic map layer 203 in order to accurately perceive the ego's surrounding environment, predict the future behavior of other agents within the surrounding environment, and then plan for the safe operation of the ego vehicle within the surrounding environment. In this way, an ego vehicle may efficiently access the information that will be used for different purposes along parallel information paths within different layers of the map 200.

Returning to FIG. 2, the map 200 may also include a priors layer 204. The priors layer 204 may provide semantic information regarding dynamic and behavioral aspects of the real-world environment. This information may include observed prior agent trajectories and other object behaviors, which may collectively be referred to as "priors," which are encoded into the priors layer 204 and made available to an ego vehicle via the map. Unlike the information in the geometric map layer 202 and the semantic map layer 203, the information in the priors layer 204 may be approximate, and may represent probabilities about dynamic parts of the real-world environment that may be used to corroborate or otherwise inform predictions and behavior plans that are derived by an ego vehicle. One example of such information includes prior vehicle trajectories that indicate how other vehicles navigated a given intersection (e.g., speed, acceleration, turning radius, etc.), which may be used as an input to an ego vehicle's prediction and planning operations. As further examples, the priors layer 204 may include parking priors that indicate areas in the map 200 where vehicles have been observed to park, or an observed pattern of pedestrians crossing a road at a place where there is no crosswalk.

The priors layer 204 may also include prior observed information regarding fixed semantic elements within the real-world environment that are nonetheless dynamic in some relevant way. For example, the priors layer 204 may include priors for a given traffic signal that indicate the order of the light sequence and dwell time within each state that have been observed in the past. Further, different light sequences may be observed at different times of the day/week, which may also be embodied within the priors layer. Other examples of such fixed semantic elements within the real-world environment are also possible, the behaviors of which may be contained within the priors layer 204 in a similar way.

Referring again to FIG. 2, the map 200 may also include a real-time layer 205, which may provide information regarding temporary semantic elements that may be observed in the real-world environment. Such real-time information may include observed vehicle speeds, traffic congestion, construction zones, and similar information that may be updated on an ongoing basis. These types of real-time information may be obtained by vehicles operating within the real-world environment, as well as other sources such as a traffic data service that utilizes traffic cameras, among other possibilities. In general, the real-time layer 205 may be the only layer of the map 200 that is updated in real time during operation of a vehicle, and may serve as the basis through which a plurality of vehicles share real-time map information.

The example illustrated in FIG. 2 provides one example of the map layers, and the corresponding delineations between different types of map data, that may make up the map 200. Various other arrangements are also possible.

In general, the creation of the multi-layer map 200 discussed above may involve several phases, beginning with the collection of sensor data for a given real-world environment, which could take various forms (e.g., image data, LiDAR data, GPS data, IMU data, etc.). The collected sensor data is fused together and processed in order to generate the geometric data for the high-resolution map, which may involve the use of a SLAM technique as well as various other data processing techniques, examples of which may include segmentation, projection, and filtering. This geometric data may serve to define the coordinate frame for high-resolution map, and any other data encoded into the high-resolution map may be represented in terms of this coordinate frame. Next, the processed sensor data may be analyzed using computer-vision and/or machine-learning techniques in order to automatically generate an initial set of semantic data for the high-resolution map, which may involve the use of one or more object detection models. This initial set of semantic data may then undergo a human curation/validation stage during which human curators review and update the initial set of semantic data in order to ensure that it has a sufficient level of accuracy for use in a high-definition map (e.g., position information that is accurate at a centimeter-level). Lastly, the generated geometric data and the updated semantic data may be combined together into the final set of map data that defines the high-resolution map for the given real-world environment.

Disclosed herein is a framework that leverages this multi-layer structure of the map in order to effect more intelligent updates to the map. In particular, the disclosed framework for effecting map updates may generally involve collecting sensor data that is representative of a real-world environment, and based on an evaluation of the collected sensor data, detecting a change to a given area of the real-world environment. Additional information may then be derived about the detected change, and a determination may be made regarding which of the one or more layers of the map should be updated in view of the detected change. The change may then be effected within the map by updating the one or more layers. Thereafter, the given area within the map that was updated may be re-evaluated one or more times to determine whether to effect any further updates to the map data for the given area. One example of this disclosed framework for effecting map updates will now be generally described with reference to FIG. 3, and will be followed by several specific examples in FIGS. 4A-4D.

Figure 3:
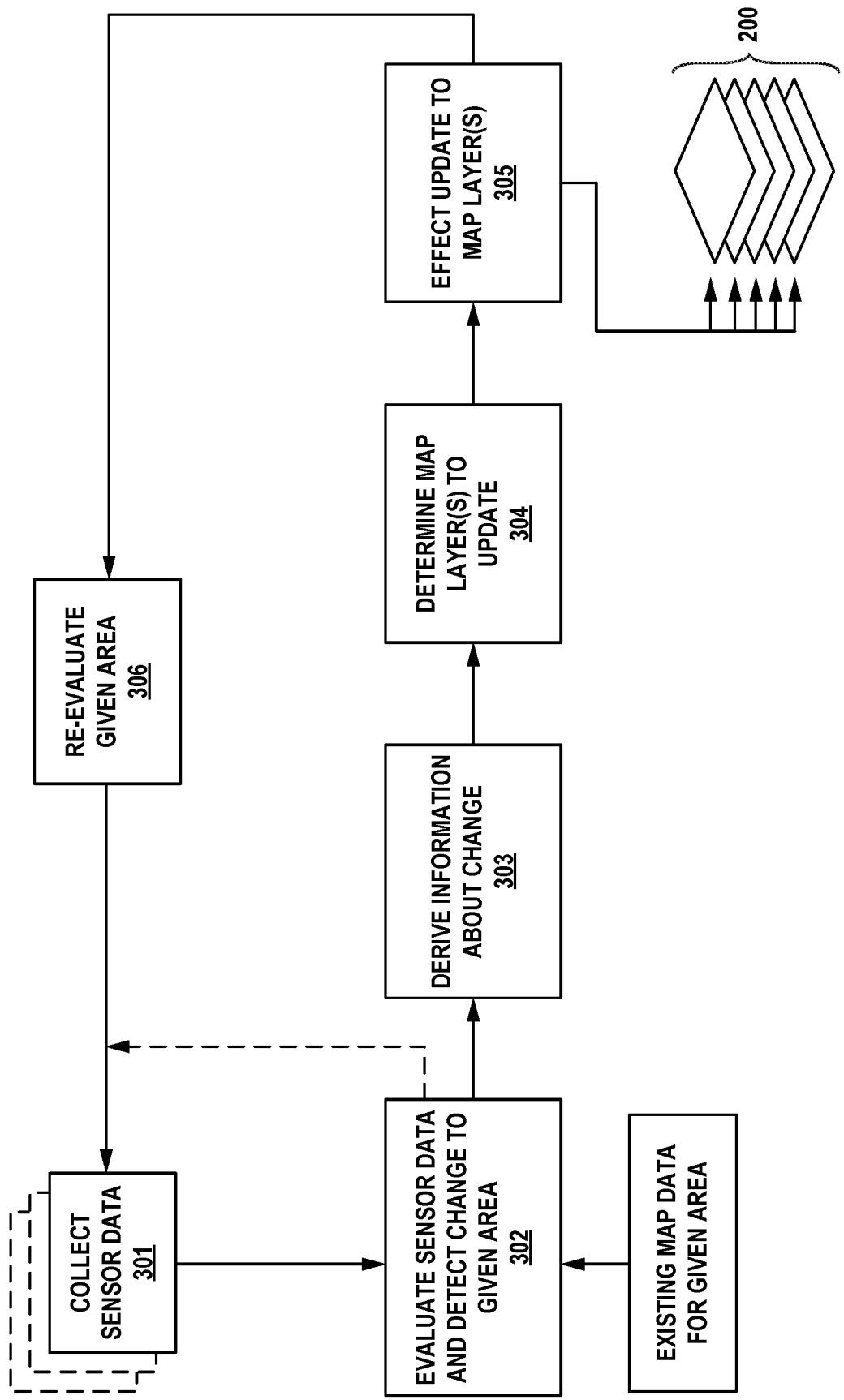
FIG. 3 is a diagram that illustrates one example of a framework that incorporates the disclosed technique for effecting map updates based on collected sensor data.

At a high level, the example framework shown in FIG. 3 may begin with a collection of sensor data that is representative of a real-world environment, as shown in block 301. In this regard, the collected sensor data discussed herein may generally refer to sensor data captured by one or more sensor-equipped vehicles operating in the real-world environment and may take various forms.

For instance, a given vehicle's sensors may generally comprise any system of one or more sensors, embodied in any form, that is capable of capturing sensor data and/or other localization information from which a representation of a trajectory having a given level of accuracy (e.g., lane-level accuracy) can be derived—including a system comprising any one or more of a LiDAR unit, a monocular camera, a stereo camera, a GPS unit, an IMU, a Sound Navigation and Ranging (SONAR) unit, and/or a Radio Detection And Ranging (RADAR) unit, among other possible types of sensors.

One possible example of such a sensor system may take the form of a LiDAR-based sensor system that is comprised of LiDAR unit combined with other sensors such as cameras (e.g., a 360°-camera array) and/or and telematics sensors, which may be embodied in a system that can be affixed to an exterior portion of a vehicle (e.g., the roof). Another possible example of such a sensor system may take the form of a camera-based sensor system that is comprised of a monocular and/or stereo camera along with telematics sensors, which may be the embodied within a device such as a smartphone, a tablet, a dashcam, or the like that can be placed somewhere within a vehicle (e.g., by being mounted on a dashboard, windshield, or exterior body of a vehicle). Yet another possible example of such a sensor system may take the form of telematics-only sensor system comprised primarily of telematics sensors such as an Inertial Measurement Unit (IMU) and/or a Global Positioning System (GPS) unit, which may be embodied in a device such as a smartphone, a tablet, a navigation unit, or the like that can be placed somewhere within a vehicle (e.g., by being mounted on a dashboard or windshield of a vehicle, being placed in a cupholder or tray within the center console, or simply being in the pocket of a driver or passenger within the vehicle).

As still another possibility, the collected sensor data may include an indication of how well the captured sensor data in a given area compares to the geometric map layer during the localization operation. This may provide an estimate of how well the "physical character" of the given area, as detected by the vehicle, matches the physical characteristics that are encoded within the map data. As one example, a vehicle's on-board computing system and/or an off-board computing system may be configured to generate an error or similar alert when the localization operation fails to correlate, or snap, the vehicle's captured sensor data to the map data for the surrounding real-world environment at a given confidence level (perhaps over a given period of time).

In a similar way, the collected sensor data may include an indication of how well the captured sensor data in a given area compares to the semantic map layer. For instance, semantic elements identified from captured sensor data during operation may be analyzed for their correlation to the semantic map layer as a reference. This type of snapping may attempt to align lane boundaries, painted road markings, traffic signals, and the like with corresponding elements in the semantic map layer. As with the localization errors, semantic snapping errors may occur when detected semantic features do not sufficiently align with the reference data in the semantic map layer, and a corresponding alert may be generated.

The foregoing provides some examples of the sensor data that may be collected, either alone or in combination, at block 301 and used within the framework shown in FIG. 3. However, it should be understood that various other types of sensor data may also be collected and used within the framework, as appropriate.

At block 302, the collected sensor data may be evaluated and, based on the evaluation, a change to a given area of the real-world environment may be detected. In this regard, block 302 may involve the evaluation of both raw sensor data as well as derived data that is based on the raw sensor data (e.g., a vectorized representation derived from the raw sensor data). Depending on the nature of the detected change, these operations may be performed on-vehicle, off-vehicle by a back-end computing platform that collects captured sensor data from a plurality of vehicles, or some combination of these. Further, the operations of evaluating the collected sensor data and detecting a change may take various forms, which may depend on the type of sensor data being evaluated and the type of evaluation being performed.

In a first implementation, these operations may involve detecting a new semantic element (e.g., a road barricade, a traffic signal, road sign, etc.) at a given area within the real-world environment that was not previously located at the given area. A change detection of this type may involve the use of a machine-learning model, may be executed in one or more different ways, and may involve one or more different types of sensor data.

As one example, the function of detecting a new semantic element may involve a comparison between collected 3D sensor data, such as LiDAR data, and geometric map data for the given area. As another example, the function of detecting a new semantic element involve a comparison between collected 2D image data and a reference set of 2D images for the given area, which may be correlated with the map for the given area. In this respect, although types of multi-layer, high-definition maps discussed herein might not contain 2D image data per se, such a map may be based on (e.g., it may have been created based on) captured sensor data for the given area that included 2D image data, etc., and this 2D image data may subsequently serve as a set of 2D reference images corresponding to the given area of the real-world environment. Other types of comparisons between newly-collected sensor data and a set of reference data for a given area of a real-world environment are also possible.

Whatever the class of collected sensor data and corresponding reference data, one or more machine-learning models (e.g. a change-detection model or the like) may be used to carry out the comparison between the collected sensor data and the corresponding reference data and thereby determine whether differences in the data exist. Such differences may collectively be referred to as a "delta" between the two data sources, which may indicate one or more changes to the given area.

For instance, in some embodiments, a first set of one or more machine-learning models may be used that are configured to both identify a delta and then also characterize the changes (e.g., via object detection). Accordingly, some changes may be detected and classified as one or more new semantic elements.

In other embodiments, after a delta is identified using the first set of one or more machine-learning models, the identified delta may then be passed to a second set of one or more machine-learning models (e.g., object detection models) that function to characterize the changes. This multi-stage approach may allow the computational demands to be distributed among different computing systems. For example, the first set of one or more machine-learning models may comprise relatively less demanding comparison model(s) that may be run by an on-vehicle computing system, whereas the second set of one or more machine-learning models may comprise relatively more demanding model(s) that may be run by an off-vehicle, backend computing platform.

In still another embodiments, the collected sensor data may first be evaluated using a first set of one or more machine-learning models that are configured to detect and classify semantic elements within the collected sensor data (e.g., object detection models), and the output of this first set of one or more machine-learning models may then be compared to semantic map data for the given area, which may involve the use of a second set of one or more machine-learning models. A resulting delta may indicate the presence of new semantic objects that were detected within the captured sensor data. Various other ways to compare the collected sensor data to the reference data for the given area are also possible.

In a second implementation, evaluating the collected sensor data to detect a change may involve evaluating the snapping performance of sensor data from multiple different vehicles that operated in the real-world environment over some period of time in order to determine whether there are any areas within the real-world environment where either geometric snapping (i.e., localization) or semantic snapping performance falls below a given threshold. For example, if localization errors or semantic snapping errors are consistently occurring when vehicles operate in a given area of the real-world environment such that an error occurrence rate for the given area exceeds a given threshold, an off-vehicle computing platform may determine with a relatively high degree of confidence that a change has occurred in the given area, and that an update to one or more layers of the map is warranted. In this regard, the snapping performance data that is evaluated may be a part of the sensor data collected at block 301, as noted above. However, it should also be understood that some types of semantic snapping performance data evaluated at block 302 may be generated by an off-vehicle computing platform, rather than by an on-board computing system of a sensor-equipped vehicle, based on the collected sensor data.

In a third implementation, evaluating the collected sensor data to detect a change may involve recognizing a new behavior pattern, such as a vehicle trajectory, that is not reflected in the existing map. In some examples, and similar to the snapping errors discussed above, a single instance of a given behavior pattern might not be sufficiently indicative of a change to a given area of the real-world environment. Accordingly, an off-vehicle computing platform may collect sensor data from one or more vehicles operating in the real-world environment over time. A given behavior pattern may need to be observed in the sensor data frequently enough that a certain confidence level is reached before a change to the real-world environment is detected that warrants an update to the map.

In this regard, detecting a change to the real-world environment in each of the implementations discussed herein may involve determining a confidence level that is associated with the change. The confidence level associated with a detected change may be based on various factors, either alone or in combination. As one possibility, the confidence level associated with a detected change may be based on the accuracy of the sensors that were used to collect the evaluated sensor data. For example, sensor data that is collected by a LiDAR-based sensor system of an autonomous or semi-autonomous vehicle may be relatively more accurate (e.g., centimeter-level accuracy) than sensor data that is collected by a standalone GPS unit (e.g., meter-level accuracy). As another possibility, the confidence level may be based on the number of times the change has been detected across multiple collections of sensor data, which may include collections by different vehicles having different sensors and associated levels of accuracy. To determine a given confidence level, the number of times the change is detected may be expressed as a rate (e.g., the change is detected 75% of the time) or as a total number (e.g., the change is detected 25 times), or a combination of both.

In some situations, an off-vehicle computing platform may detect a change having a relatively low confidence level, which may not warrant an update to the map. For instance, the off-vehicle computing platform may detect a change in the respective sensor data sets captured by relatively few vehicles that traversed the given area of the real-world environment. Accordingly, the off-vehicle computing platform may request additional sensor data from the given area in order to build more confidence in the detected change, as represented by the dashed line from block 302 in FIG. 3. As more vehicles collect sensor data in the given area, and as the change is detected across more sensor data sets collected by different sensors, the determined confidence level in the change may increase. When the confidence level in the detected change reaches a predetermined threshold, the computing platform may determine that an update to the map is warranted and may proceed to effect an update to the map according to the framework described herein. Other examples are also possible.

Numerous other implementations for both evaluating sensor data and detecting a change to a given area of the real-world environment are also possible. Further, it should be understood that the implementations discussed above and otherwise contemplated herein are not mutually exclusive, and that one or more different evaluations of collected sensor data, either alone or in combination, may contribute to the detection of a given change to the real-world environment.

At block 303 of the example framework shown in FIG. 3, information about the detected change to the given area of the real-world environment may be derived. Such derived information, and the manner in which it is derived, may take various forms.

For example, deriving information about the detected change may involve deriving information about the type of change that has been detected. The types of changes may take various forms. As one possibility, the type of change may involve the addition of a new semantic feature to the given area of the real-world environment. In this regard, a new semantic feature may involve a single semantic element or multiple semantic elements that collectively comprise the semantic feature. As another possibility, the type of change may involve a change to the physical geometry of the given area of the real-world environment. As yet another possibility, the type of change may involve a newly observed behavior pattern within the given area of the real-world environment. Other types of changes are also possible.

To derive information about the type of change that has been detected, one or more object detection models may be used to classify objects that represent the change to the real-world environment. In this regard, it should be understood that certain types of information about the change may be derived in conjunction with detecting the change in the first instance. For instance, some change-detection models discussed above with respect to block 302 may not only identify differences between the collected sensor data and the reference data, but may also classify the object(s) that are the source of the change. Deriving information about the type of change may take other forms as well.

As another example, deriving information about the detected change may involve deriving a level of permanence associated with the change, which may be closely related to the type of change. Deriving a level of permanence associated with the change may inform which layer(s) of the map should be updated in response to the change, as discussed further below. For instance, a construction zone (i.e., a new semantic feature) and observed vehicle trajectories in the area of the construction zone (i.e., a newly observed behavior pattern) may represent temporary changes, whereas a widened roadway and a new traffic lane (i.e., changes to the physical geometry of the given area) may represent more permanent changes. In this regard, certain aspects of information related to the permanence of a given change might be inherently derived at the time that the type of change is classified.

Another example of the information that may be derived about the detected change may be a location of the change within the given area of the real-world environment, which may be used to determine a corresponding location within the map data at which to effect an update. In some embodiments, information regarding the location of a change may be derived via the object detection model(s) that are used to derive information about the type of change that was detected. In some other embodiments, deriving information about the location of the change might be based on the derived locations of several other changes. For instance, one or more traffic control devices may themselves be indicative of a change to a given area of the real-world environment, insofar as they are new semantic features that are not represented in the map data. But such semantic features may also imply the existence of a construction zone, the overall bounds of which may need to be derived by considering a collection of identified traffic control objects in the given area. In some cases, this may involve collected sensor data that originated from different sources (e.g., different vehicles). Accordingly, the location of some changes, such as a construction zone, may be derived by analyzing a combination of other, individually detected changes.

Deriving information about the location of a detected change may take various other forms as well.

Yet another example of the information that may be derived about a detected change may include additional information that may be inferred or extracted based on the context of the detected change. For instance, for a detected change that is identified and classified as a new traffic light, further semantic information may be derived such as the orientation of the traffic light and/or the corresponding lane that is controlled by the traffic light, among other information. As another possibility, for a detected change that is identified and classified as a new road sign, a 2D image of the text on the new road sign may be run through one or more natural language processing (NLP) models to determine what other additional changes the road sign may have on other information within in the map. These might include a speed restriction, a turn restriction, a suggested detour route, the possible presence of pedestrians/construction workers, etc., as well as a time-based restriction on any of the above (e.g., "No Right Turn Between 7:00 am and 7:00p.m.).

Other types of derived information that may be inferred or extracted from one or more detected changes are also possible.

As shown at block 304 of FIG. 3, after the information about the detected change to the given area has been derived, the example framework may next involve determining one or more layers of the map to update based on the derived information. This function may involve determining a primary map layer to be updated, as well as one or more additional map layers to which the change, or effects of the change, should be propagated. Further, the determination of which map layer(s) to update may be based on one or more factors such as the type of change or a time frame associated with the change, among other possibilities.

As one example, a change may be detected within the collected sensor data that is relatively permanent in nature, and may involve changes that must be propagated "upward" from a primary map layer to other layers of the map 200. For instance, a detected change may indicate that a roadway has been widened and new traffic lanes have been added. Such a change may be initially designated for the base map layer 201, as it implicates the bottom level road network on which some of the map 200 is based. Further, it may be determined that the geometric map layer 202 and the semantic map layer 203 must also be updated with derived information corresponding to the change. Various other examples are also possible.

At block 305, an update may be effected to one or more layers of the map. In particular, the derived information about the change to the given area of the real-world environment that was determined in block 303 (e.g., the type of change, location, etc.) may be added to the one or more layers of the map that were determined at block 304. This may involve, for example, derived information regarding a new, permanent semantic feature may be added to the semantic map layer 203. As another example, derived information regarding a new, temporary semantic feature may be added to the real-time layer 205.

As yet another example, derived information regarding a new change to the physical geometry of the given area may be added to the geometric map layer 202. In this regard, effecting updates to the geometric map layer 202 may generally involve replaced outdated information (e.g., an outdated set of voxels within the 3D representation of the real-world environment) with an updated set of voxels representing 3D point cloud information, sometimes referred to as a "patch." Accordingly, effecting an update to the geometric map layer 202 may involve generation of a patch based on sensor data collected by one or more vehicles that recently operated within the given area.

As yet another example of effecting an update to the map, derived information regarding a newly observed behavior pattern may be added to the priors layer 204. Various other examples of effecting updates to the map are possible, including updates that are effected across multiple layers in one or more combinations of the examples noted above.

At block 306, the given area of the real-world environment may be re-evaluated one or more times to determine whether to effect any further updates to the map for the given area. For example, re-evaluation of the given area may result in various types of further updates, such as a reversion of a previous map update that is determined to no longer apply based on additional collected sensor data for the given area. This might occur in the case of various temporary map updates (e.g., construction zones, temporary road closures, etc.) that are no longer detected upon re-evaluation.

Another type of further update to the map may include a re-designation of the layer at which a previous change was made to the map data. As one possibility, a change that is initially determined to be temporary, (e.g., a road closure) may initially be added as an update to the real-time layer 205. However, the change may persist until a threshold period of time is reached, after which a further update may be effected to re-designate the road closure to at least the base map layer 201, as possibly the geometric map layer 202 and the semantic map layer 203, as appropriate.

Re-evaluating the given area of the real-world environment to determine whether to effect any further updates to the map may take various other forms as well.

Several illustrative examples of how the disclosed technique may be used to effect map updates based on captured sensor data will now be described with reference to FIGS. 4A-4D.

Figure 4A:
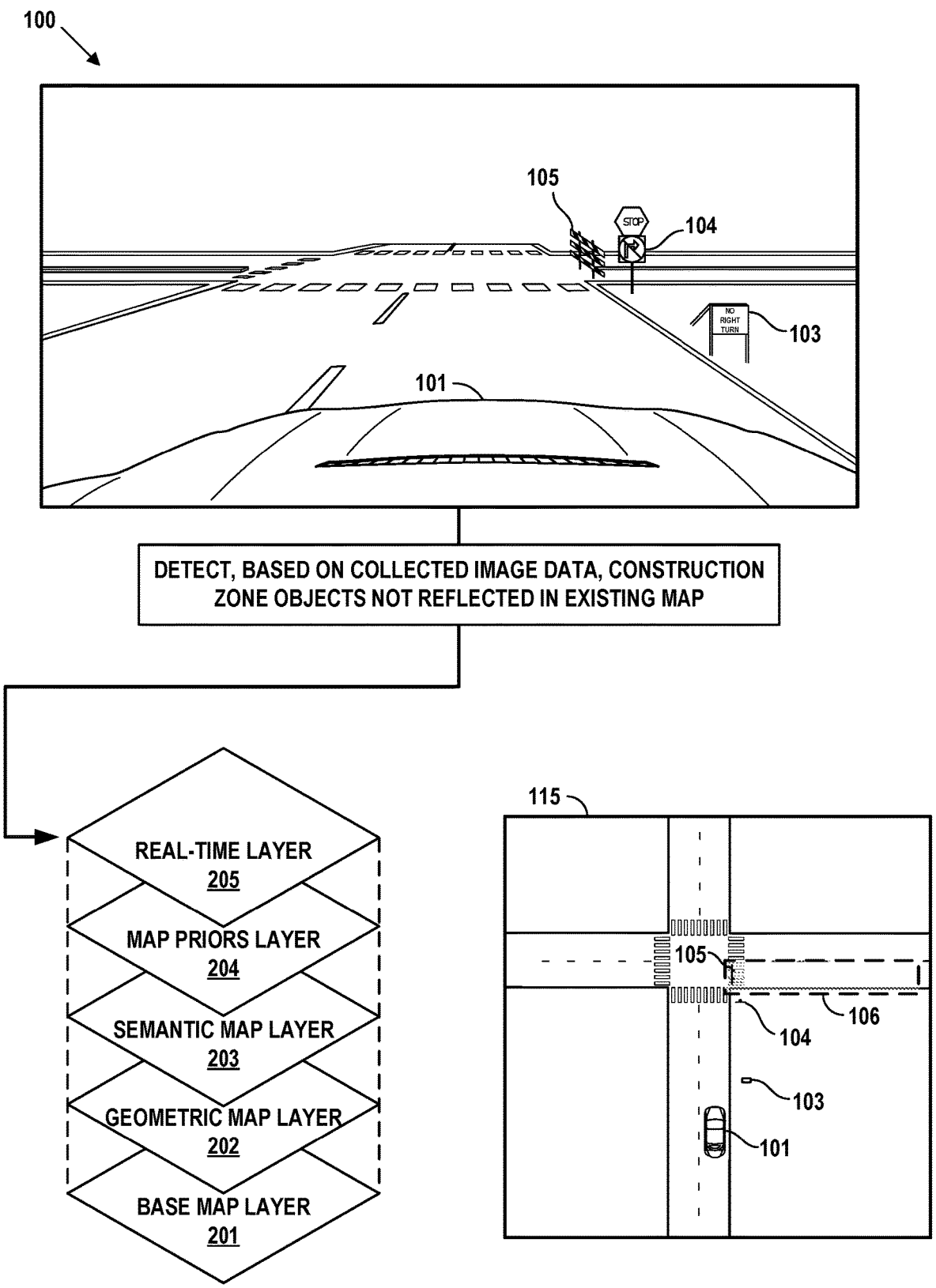
FIG. 4A is a diagram that illustrates one example of updating map data based on vehicle-captured sensor data indicating a construction zone.

Beginning with FIG. 4A, the forward-facing view from vehicle 101 in FIG. 1A is again shown, illustrating the given area of real-world environment 100. As noted previously, the given area may include several objects, such as turn restriction signs 103 and 104 and a road barricade 105 that are indicative of a temporary construction zone, and which are not reflected in the current map data of real-world environment 100.

In FIG. 4A, vehicle 101 may be a human-driven vehicle equipped with a sensor that captures image data, such as a monocular camera (e.g., a dashboard camera) that captures 2D image data. The 2D image data may include indications of the signs 103 and 104 and the barricade 105. Vehicle 101 may also capture GPS sensor data that may provide an approximation of the location of vehicle 101 within the given area of real-world environment 100. The 2D image data may then be evaluated by comparing it to a set of 2D reference images for the given area that corresponds to the current map data. For example, a computing platform, which may include an on-vehicle computing platform, an off-vehicle computing platform, or a combination of both, may compare the two image sets using a change-detection model and then identify the detected changes as the traffic control elements noted above.

The computing platform may also derive additional information about the changes, as appropriate. For instance, the computing platform may derive a type of change (i.e., new semantic elements) for each of the changes, and a location for each of the changes based on one or more object detection models. Further, based on an evaluation of the additional contextual information provided by the signs 103 and 104 (e.g., using an NLP model) and the positioning of the barricade 105, the computing platform may derive an indication that a given lane is closed to traffic due to the presence of a construction zone. Still further, based on the classification of the newly detected objects as traffic control elements that are typically temporary in nature, the computing platform may determine that the changes to the given are of the real-world environment are temporary. The computing platform may derive other information about the changes as well.

The computing platform may then determine one or more map layers to update based on the detected changes and the derived information about the changes. As shown in FIG. 4A, because the detected changes are determined to be temporary in nature, they may be designated as updates to the real-time map layer 205.

Accordingly, the computing platform may effect updates to the real-time layer 203 by adding information for new semantic elements 103, 104, and 105, as depicted in the top-down view 115 showing a visualization of the updated map 115. In addition, the computing platform may update the real-time layer by adding an indication of the construction zone that is blocking traffic in the given lane, shown in the top-down view 115 as polygon 106. Such updates may be distributed (e.g., pushed) to one or more other vehicles and/or a transportation-matching platform that may use the map. The updates may be distributed in various other ways as well.

The computing system may also flag the given area of real-world environment 100 for re-evaluation and, at a later time, the given area may be re-evaluated. For example, vehicle 101 or another vehicle may capture sensor data including new 2D images of the given area that indicate that the previously detected traffic control elements are no longer present. In response, the computing platform may revert the previous updates that were made to the real-time layer 205 (e.g., by pushing a command to revert the previous updates) such that the map may return to its original state.

Figure 4B:
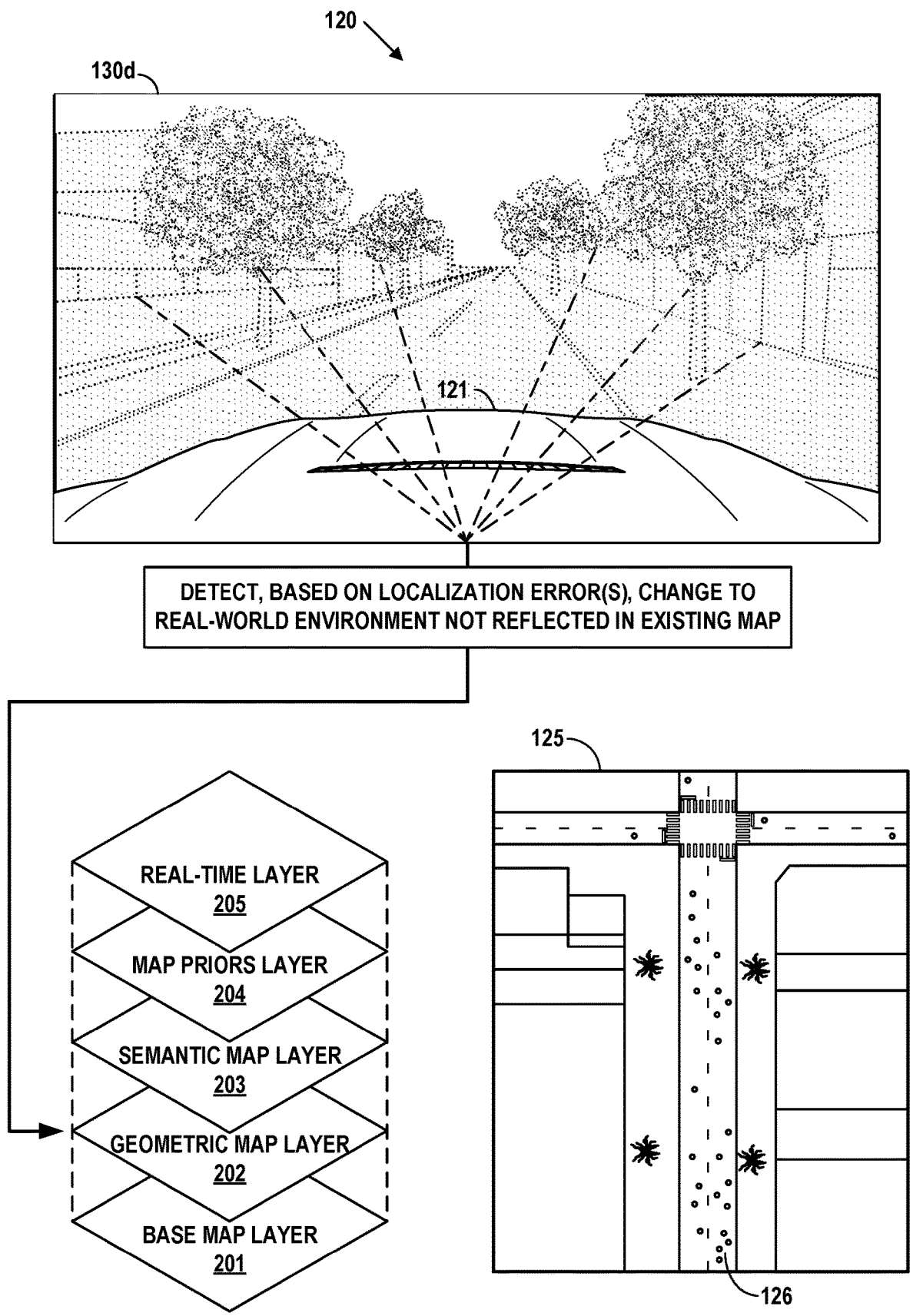
FIG. 4B is a diagram that illustrates one example of updating map data based on vehicle-captured sensor data indicating seasonal changes to the physical characteristics of a real-world environment.

Turning to FIG. 4B, the visualization 130d of 3D sensor data from the forward-facing perspective of vehicle 121 in FIG. 1C is again shown, illustrating the given area of real-world environment 120. As discussed previously, the given area may include substantial tree growth due to the passage of time that is not reflected in the current map of the real-world environment.

As noted above, as vehicle 121 traverses the given area, it may collect sensor data that includes 3D LiDAR data which may be processed along with other captured sensor data through a SLAM technique. The autonomy system may then attempt to snap the processed sensor data to the geometric map layer 202 for the given area. However, due to the physical changes to the given area of real-world environment 120, as discussed above, a localization failure may occur. Thus, the autonomy system of vehicle 121 may generate a snapping alert indicating a reduced confidence level achieved by the localization operation.

Based on the snapping alert, the autonomy system of vehicle 121 may detect a change to the given area. Additionally or alternatively, the snapping alert may be transmitted to an off-vehicle computing platform that may aggregate such alerts from vehicle 121 and other vehicles. Using this information, and based on the currently available map data, the computing platform may generate a heatmap for the given area that indicates the location and corresponding frequency of such snapping alerts. An example of such a heatmap 125 is shown in FIG. 4B, in which the locations of numerous individual snapping alerts are mapped as dots 126. As shown, the heatmap 125 and indicates that the given area of real-world environment 120 has a relatively high occurrence of snapping alerts.

Accordingly, vehicle 121 and/or the off-vehicle computing platform may derive additional information about the change(s) to the given area, which may include determining the extent of the mismatch between the captured LiDAR data and the 3D representation encoded within the geometric map layer 202. In turn, this information may provide an indication that the captured 3D sensor data from vehicle 121 is sufficient to create an accurate patch with which to update the geometric map layer 202. Further, it may be determined that the geometric map layer 202 is the only layer to be designated for updates.

Based on this information, vehicle 121 and/or the off-vehicle computing platform may effect an update to the geometric map layer 202 for the given area by distributing the patch. In this regard, vehicle 121 might create the patch and transmit it to the off-vehicle computing platform for distribution to other vehicles or a transportation-matching platform. As another possibility, the off-vehicle computing platform may create and distribute the patch. Other arrangements involving one or more other intermediate computing systems are also possible.

Thereafter, the given area of real-world environment 120 may be re-evaluated one or more times to determine if and when additional map updates should be made. For example, it may be determined that, because the map updates shown and discussed in reference to FIG. 4B were seasonal in nature, that the given area will likely change again at a future time, and that additional map updates will be required. Thus, a request may be created that causes a sensor-equipped vehicle to traverse the given area at the future time (e.g., in 5 months) in order to collect additional sensor data and to effect another update to the map. In this way, the map may be kept relatively accurate and up to date.

Figure 4C:
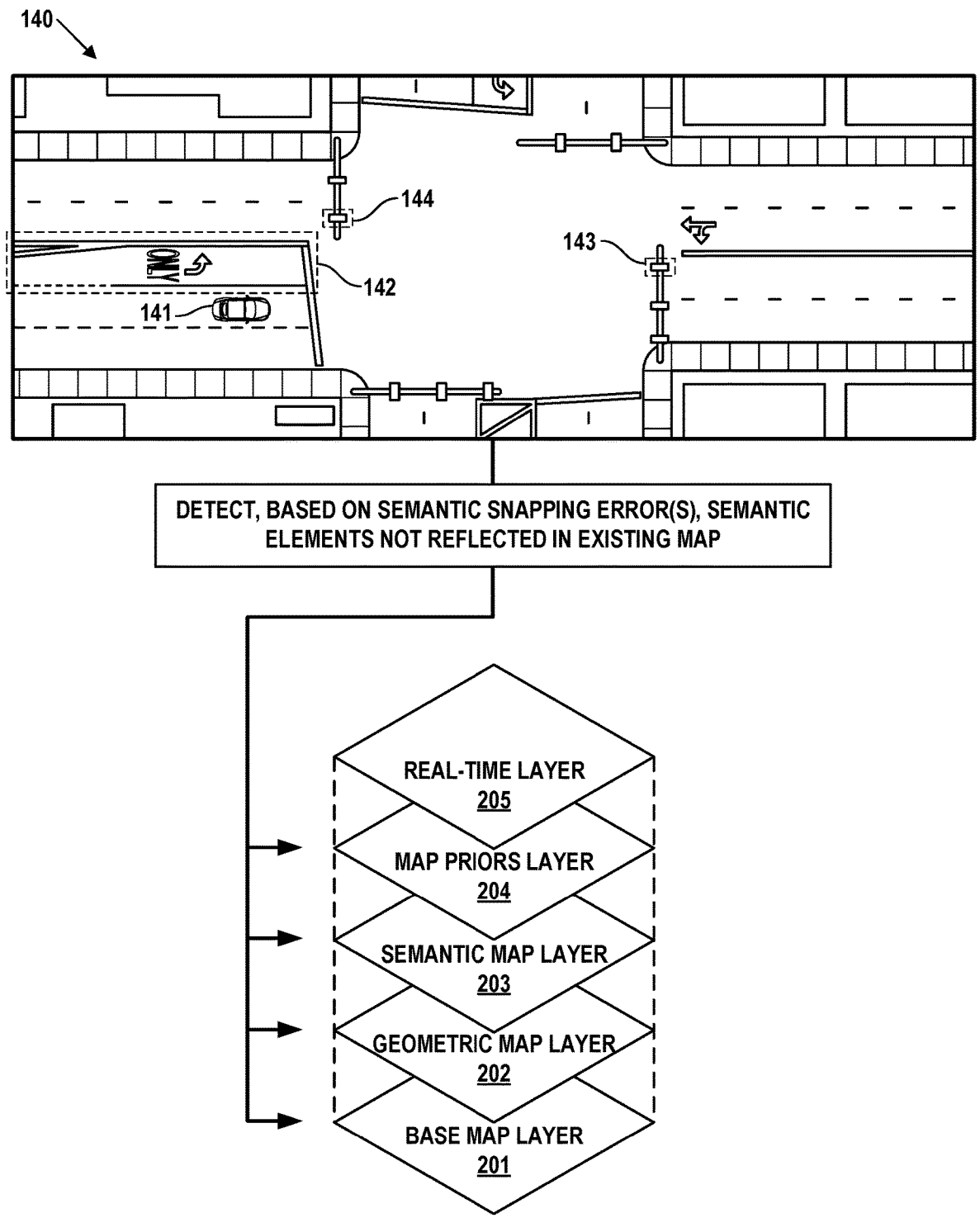
FIG. 4C is a diagram that illustrates one example of updating map data based on vehicle-captured sensor data indicating a changed intersection configuration.

Turning to FIG. 4C, another example of effecting map updates based on collected sensor data is illustrated. In FIG. 4C, a top down view of a vehicle 141 operating in a given area of a real-world environment 140 is shown. Within the given area, various permanent changes exist that are not reflected in the map data for the given area, including a new dedicated turn lane 142, along with a new traffic signal 143 that controls traffic movements in the new lane. Further, the existing traffic signal 144 has been expanded from three lights (i.e., green, yellow, red) to five lights (i.e., green arrow, yellow arrow, green, yellow, red) to incorporate a new, protected left turn cycle for traffic in the opposite direction.

Vehicle 141 may capture various types of sensor data within the given area shown in FIG. 4C, including 2D and 3D image data, LiDAR data, and others. A computing platform, which again may include either or both of an on-vehicle computing platform or an off-vehicle computing platform, may evaluate the sensor data to detect changes in various ways. For instance, the computing platform may attempt to snap the representation of the semantic elements (e.g., lanes, traffic signals) that is derived in the vehicle's perception operation with the semantic map layer 203 for the given area. In the example shown in FIG. 4C, the semantic snapping function may indicate several correlation mismatches, including the new lane and traffic signal changes noted above, resulting in a snapping alert and the detection of the changes. The computing platform may evaluate the sensor data in various other ways as well, such as by comparing the captured 2D and 3D image data with reference image data of the given area, as discussed in some examples above. Various other evaluations are also possible.

The computing platform may also derive additional information about the changes, where such information is not already included in the detection of each change. For example, in addition to classifying the new semantic objects and determining their location within the map's reference frame (e.g., using one or more object detection models), the computing platform may determine an orientation of traffic signal 143, as well as an indication of the light cycle observed for traffic signal 143.

The computing platform may then determine several map layers to be updated based on the detected changes and the derived information about the changes. For example, based in part of the detected changes being identified as relatively permanent changes to the physical geometry of real-world environment 140, the computing platform may designate the new dedicated turn lane 142 as a primary update to base map layer 201 and the road network encoded therein. Further, the computing platform may determine that an update of this kind to the base map layer 201 will additionally need to be propagated to the geometric map layer 202 and the semantic map layer 203. Thus, the computing platform may designate these layers to be updated with an indication of the dedicated turn lane 142, as appropriate.

Similarly, the new traffic signal 143 and the modified traffic signal 144 may be designated as primary updates to the semantic map layer 203. Additionally, the computing platform may determine that the traffic signal updates should also be propagated to the geometric map layer 202. Further, the observed light cycle for traffic signal 143 may be designated as a change to the priors layer 204.

In one possible implementation, based on the detection of changes that are designated for the geometric layer 202, the computing platform may determine that the 3D sensor data captured by vehicle 141 is sufficient to create an accurate patch with which to update the ground map in the geometric map layer 202, and may create the patch accordingly. In other implementations, the computing platform may determine that the captured sensor data from vehicle 141 is not sufficient to create an accurate patch, and moreover, that recent 3D sensor data is not available for the given area in any sensor database (e.g., a sensor database housing sensor data for a fleet of sensor-equipped vehicles) or the like. Accordingly, the computing platform may generate a request for additional sensor data from the given area. In some cases, this may cause one or more sensor-equipped vehicles to traverse the area to obtain the requested sensor data to create the patch for the geometric layer 202.

After determining the one or more map layers to be updated, the computing platform may effect the updates to the determined map layers by causing an indication of the updates to be distributed to one or more other vehicles and/or a transportation-matching platform, as appropriate. In some embodiments, the updates to each respective layer might not be effected at the same time. For example, in a situation as discussed above, where sufficient 3D sensor data is not initially available to create a sufficient patch for the geometric map layer 202, the base map layer 201 and semantic map layer 203 might be updated, but not the geometric map layer 202. Instead, the computing platform may, in conjunction with requesting the needed sensor data, set a flag or similar alert that the geometric map layer 202 in the given area is in need of updating.

The computing platform may set various other types of flags or alerts indicating that the given area should be re-evaluated. For instance, a flag may be set indicating a general need for new priors relating to the intersection shown in FIG. 4B, due to the new lane configuration and traffic signal cycles. In this regard, the new priors may include vehicle trajectories as they navigate the newly configured intersection, as well as priors indicating a respective new light cycle for both the traffic signal 144—which may not have been observed by vehicle 141 due to its opposite-facing orientation—as well as traffic signal 143. Each of these types of priors may be designated as updates to the priors layer 204. Various other updates to the map based on the changes to the given area of real-world environment 140 shown in FIG. 4B are also possible.

Figure 4D:
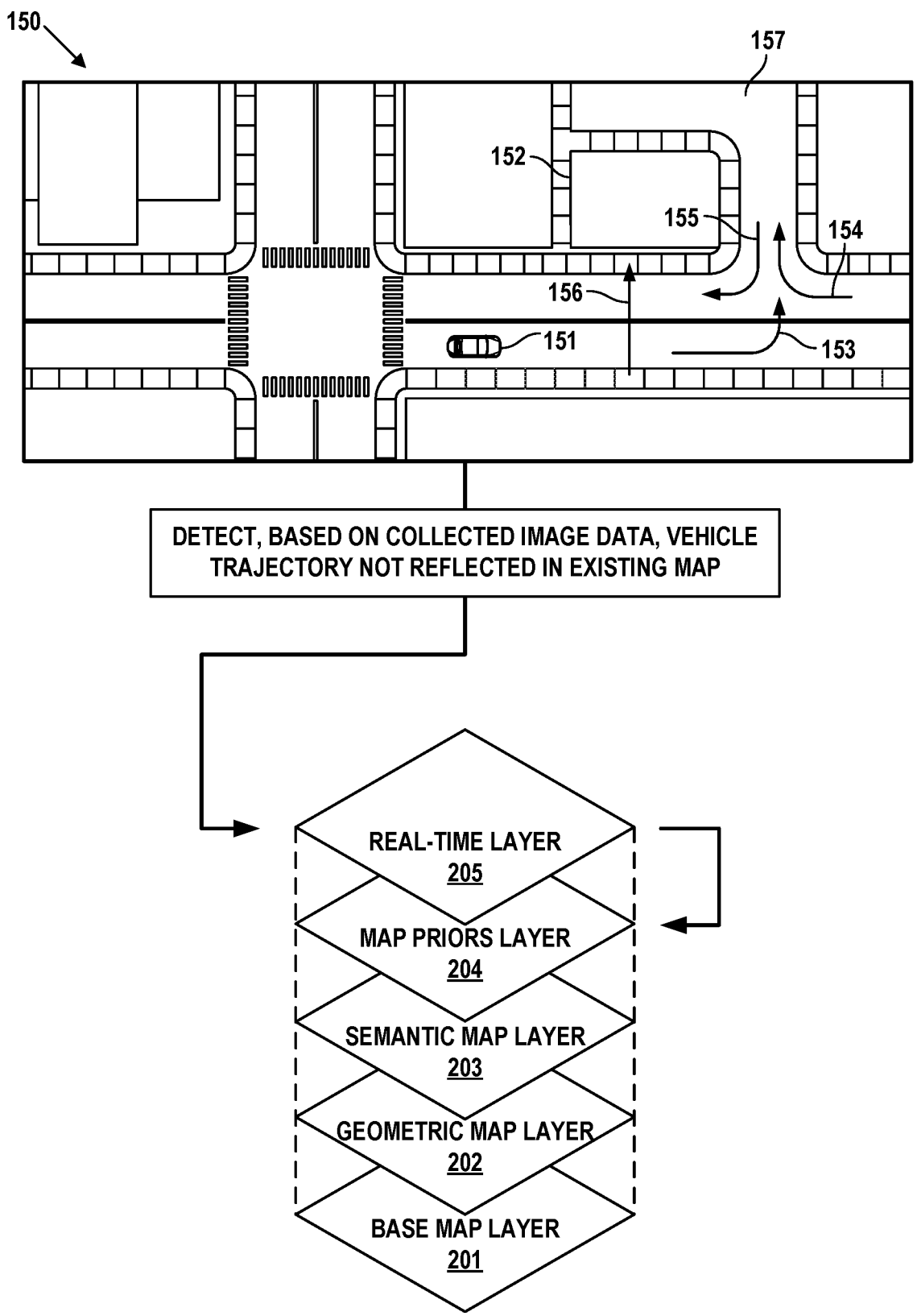
FIG. 4D is a diagram that illustrates one example of updating map data based on vehicle-captured sensor data indicating newly observed agent trajectories.

Yet another example of effecting map updates based on captured sensor data is shown in FIG. 4D, which illustrates a top down-view of a vehicle 151 operating in a given area of real-world environment 150. In the example of FIG. 4D, a change has occurred that may affect the map of the given area, but which might not be immediately detectable via captured sensor data. In particular, a building 152 shown in FIG. 4D may have recently changed uses such that the amount of car and pedestrian traffic surrounding building 152 increases. For instance, building 152 may have recently been reopened as a fast food restaurant after having been closed for a long period of time.

In FIG. 4D, vehicle 151 may be a human-driven vehicle equipped to capture sensor data in the given area including 2D image data and GPS data, among other possibilities. For instance, vehicle 151 may capture 2D image data that indicates that another vehicle followed the trajectory 153 shown in FIG. 4D, making a left turn into the parking lot of building 152. The captured sensor data indicating the trajectory 153 may be evaluated by an off-vehicle computing platform, which may determine that trajectory 153 represents a newly observed behavior that is not consistent with priors that are currently reflected in the priors layer 204 or the real-time layer 205. As another possibility, it may be determined that priors similar to trajectory 153 are reflected in the priors layer 204, but are classified as a very low probability event. In either case, the off-vehicle computing platform may determine a change to the given area of real-world environment 150 and may derive additional information about the trajectory 153, such as a date and time at which it was observed. Such information may be derived from timestamps associated with the 2D image data captured by vehicle 151, for example.

Because there may not yet be any additional sensor data indicating that the newly observed vehicle trajectory 153 is indicative of a more permanent change, the off-vehicle computing platform may initially designate the observed trajectory 153 as an update to the real-time layer 205. Accordingly, the off-vehicle computing platform may effect an update to the map that includes an indication of the new prior in the real-time layer 205. Such an update might be flagged as temporary such that, in the absence if additional priors or other updates that validate it as a more permanent change, it may eventually be removed from the real-time layer 205.

However, upon re-evaluation of the given area of real-world environment 150 by additional vehicles over time, further sensor data may be collected that includes an observation of additional priors that are indicative of a more permanent change. For instance, in addition to further observations of priors that are consistent with vehicle trajectory 153, additional priors may be observed such as vehicle trajectory 154, vehicle trajectory 155, and pedestrian trajectory 156. Similarly, new parking priors, indicating an instance of a parked car, may begin to be observed in a parking lot 157 behind the building 152.

Individually, each of these may initially be designated as an update to the real-time layer 205. However, as the occurrence of similar priors increases, they may eventually be promoted as a change to the priors layer 204. For example, a given set of similar priors may be promoted from the real-time layer 205 to the priors layer 204 based on a threshold number of observations of similar priors with a certain time period (e.g. one or more weeks or months). Various other criteria for determining that updates regarding observed priors should promoted from the real-time layer 205 to the priors layer 204 are also possible.

The foregoing framework for effecting map updates based on collected sensor data may be used for various other purposes as well.

Figure 5:
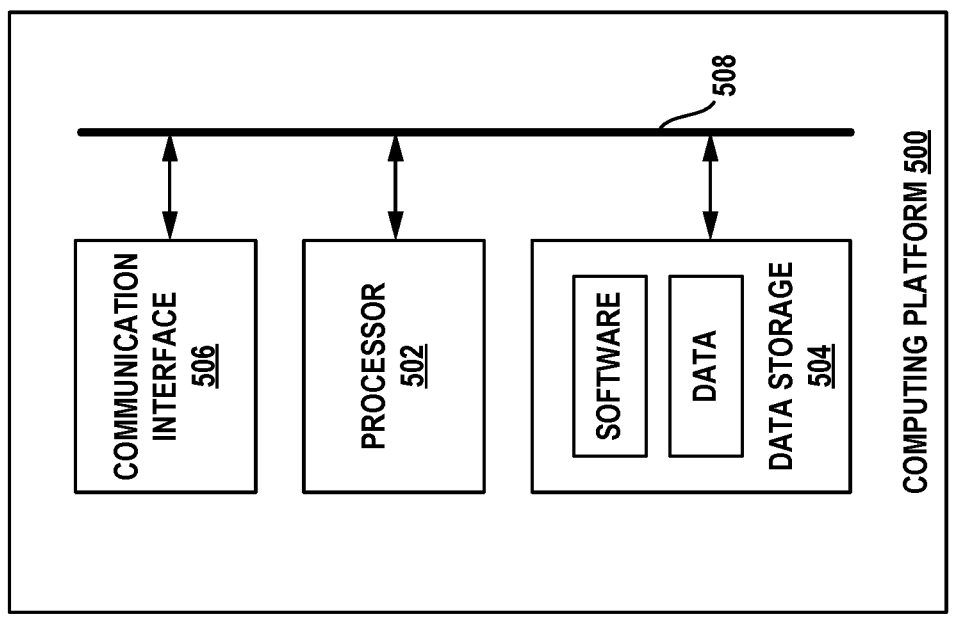
FIG. 5 is a simplified block diagram that illustrates some structural components that may be included in an example computing platform.

Turning now to FIG. 5, a simplified block diagram is provided to illustrate some structural components that may be included in an example computing platform 500, which may be configured to carry out the any of various functions disclosed herein. At a high level, computing platform 500 may generally comprise any one or more computer systems (e.g., an on-board vehicle computing system and/or one or more off-board servers) that collectively include at least a processor 502, data storage 504, and a communication interface 506, all of which may be communicatively linked by a communication link 508 that may take the form of a system bus, a communication network such as a public, private, or hybrid cloud, or some other connection mechanism. Each of these components may take various forms.

For instance, processor 502 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 502 could comprise processing components that are distributed across a plurality of physical computing devices connected via a network, such as a computing cluster of a public, private, or hybrid cloud.

In turn, data storage 504 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 504 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 5, data storage 504 may be capable of storing both (i) program instructions that are executable by processor 502 such that computing platform 500 is configured to perform any of the various functions disclosed herein (including but not limited to any the functions described with reference to FIGS. 3 and 4A-4D), and (ii) data that may be received, derived, or otherwise stored by computing platform 500.

Communication interface 506 may take the form of any one or more interfaces that facilitate communication between computing platform 500 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 500 may additionally include one or more input/output (I/O) interfaces that are configured to either (i) receive and/or capture information at computing platform 500 and (ii) output information from computing platform 500 (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 500 is one example of a computing platform that may be used with the embodiments described herein. Numerous other arrangements are possible and contemplated herein. For instance, other computing platforms may include additional components not pictured and/or more or less of the pictured components.

As noted above, although various different types of sensor-equipped vehicles may be utilized to collect sensor data within the disclosed framework, one possible use case for the updated maps is to facilitate autonomous operation of a vehicle. In view of this, one possible example of such a vehicle will now be discussed in greater detail.

Figure 6:
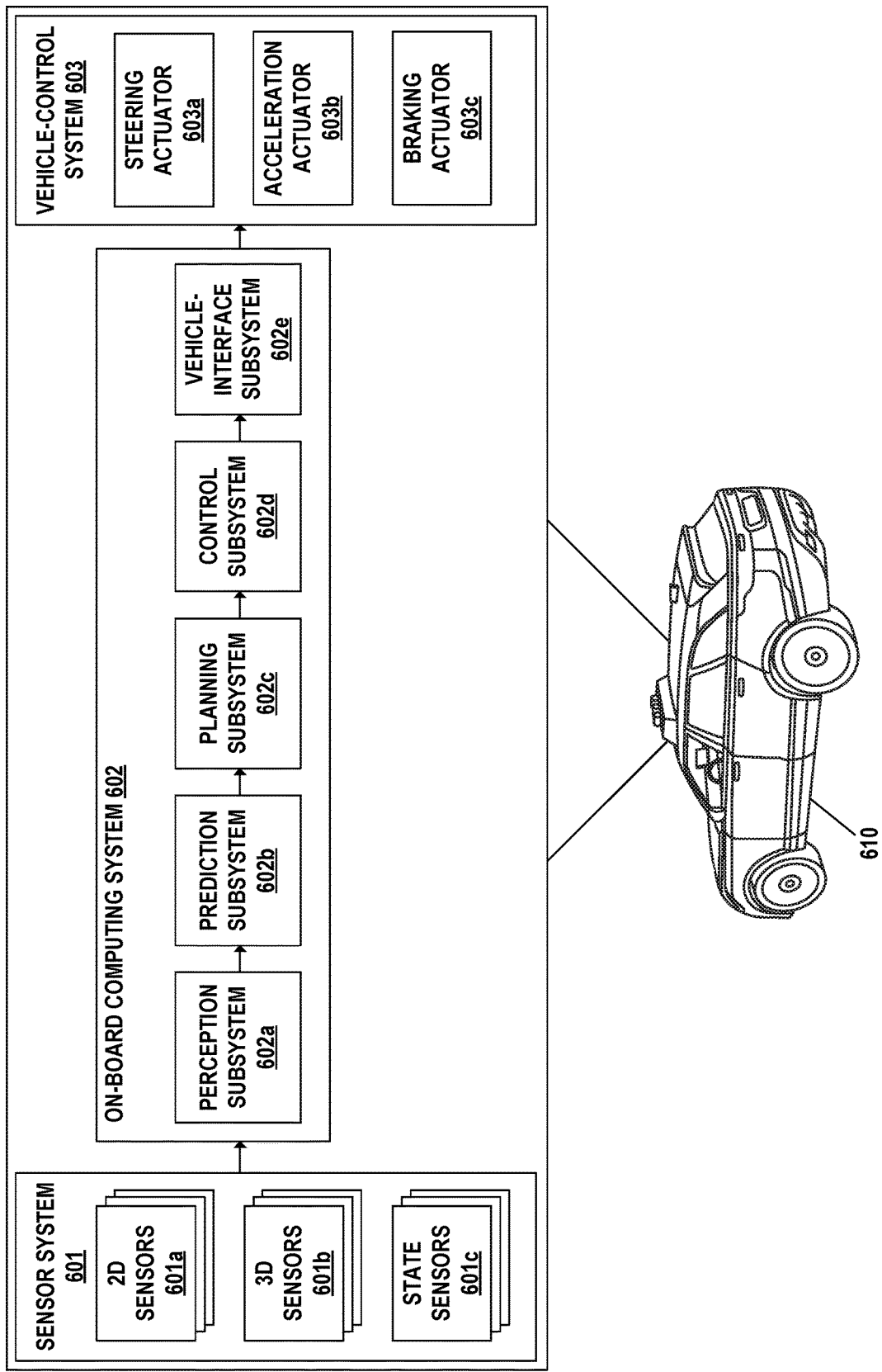
FIG. 6 is a simplified block diagram that illustrates certain systems that may be included in an example vehicle.

Turning to FIG. 6, a simplified block diagram is provided to illustrate certain systems that may be included in an example vehicle 600. As shown, at a high level, vehicle 600 may include at least (i) a sensor system 601 that is configured to capture sensor data that is representative of the real-world environment being perceived by the vehicle (i.e., the vehicle's "surrounding environment") and/or the vehicle's operation within that real-world environment, (ii) an on-board computing system 602 that is configured to perform functions related to autonomous operation of vehicle 600 (and perhaps other functions as well), and (iii) a vehicle-control system 603 that is configured to control the physical operation of vehicle 600, among other possibilities. Each of these systems may take various forms.

In general, sensor system 601 may comprise any of various different types of sensors, each of which is generally configured to detect one or more particular stimuli based on vehicle 600 operating in a real-world environment. The sensors then output sensor data that is indicative of one or more measured values of the one or more stimuli at one or more capture times (which may each comprise a single instant of time or a range of times).

For instance, as one possibility, sensor system 601 may include one or more 2D sensors 601a that are each configured to capture 2D data that is representative of the vehicle's surrounding environment. Examples of 2D sensor(s) 601a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 601a may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 601 may include one or more 3D sensors 601b that are each configured to capture 3D data that is representative of the vehicle's surrounding environment. Examples of 3D sensor(s) 601b may include a LiDAR unit, a 3D RADAR unit, a 3D SONAR unit, a 3D ultrasound unit, and a camera array equipped for stereo vision, among other possibilities. Further, in an example implementation, 3D sensor(s) 601b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 601 may include one or more state sensors 601c that are each configured to detect aspects of the vehicle's current state, such as the vehicle's current position, current orientation (e.g., heading/yaw, pitch, and/or roll), current velocity, and/or current acceleration of vehicle 600. Examples of state sensor(s) 601c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 601 may include various other types of sensors as well.

In turn, on-board computing system 602 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 602 may take the form of any one or more interfaces that facilitate communication with other systems of vehicle 600 (e.g., sensor system 601, vehicle-control system 603, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 602 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 602 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 602 such that on-board computing system 602 is configured to perform various functions related to the autonomous operation of vehicle 600 (among other possible functions), and (ii) data that may be obtained, derived, or otherwise stored by on-board computing system 602.

In one embodiment, on-board computing system 602 may also be functionally configured into a number of different subsystems that are each tasked with performing a specific subset of functions that facilitate the autonomous operation of vehicle 600, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 602.

As shown in FIG. 6, in one embodiment, the functional subsystems of on-board computing system 602 may include (i) a perception subsystem 602a that generally functions to derive a representation of the surrounding environment being perceived by vehicle 600, (ii) a prediction subsystem 602b that generally functions to predict the future state of each object detected in the vehicle's surrounding environment, (iii) a planning subsystem 602c that generally functions to derive a behavior plan for vehicle 600, (iv) a control subsystem 602d that generally functions to transform the behavior plan for vehicle 600 into control signals for causing vehicle 600 to execute the behavior plan, and (v) a vehicle-interface subsystem 602e that generally functions to translate the control signals into a format that vehicle-control system 603 can interpret and execute. However, it should be understood that the functional subsystems of on-board computing system 602 may take various other forms as well. Each of these example subsystems will now be described in further detail below.

For instance, the subsystems of on-board computing system 602 may begin with perception subsystem 602a, which may be configured to fuse together various different types of "raw" data that relate to the vehicle's perception of its surrounding environment and thereby derive a representation of the surrounding environment being perceived by vehicle 600. In this respect, the "raw" data that is used by perception subsystem 602a to derive the representation of the vehicle's surrounding environment may take any of various forms.

For instance, at a minimum, the "raw" data that is used by perception subsystem 602a may include multiple different types of sensor data captured by sensor system 601, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 600 that indicates the past and current position, orientation, velocity, and acceleration of vehicle 600. Additionally, the "raw" data that is used by perception subsystem 602a may include map data associated with the vehicle's location, such as high-definition geometric and/or semantic map data, which may be preloaded onto on-board computing system 602 and/or obtained from a remote computing system. Additionally yet, the "raw" data that is used by perception subsystem 602a may include navigation data for vehicle 600 that indicates a specified origin and/or specified destination for vehicle 600, which may be obtained from a remote computing system (e.g., a transportation-matching system) and/or input by a human riding in vehicle 600 via a user-interface component that is communicatively coupled to on-board computing system 602. Additionally still, the "raw" data that is used by perception subsystem 602a may include other types of data that may provide context for the vehicle's perception of its surrounding environment, such as weather data and/or traffic data, which may be obtained from a remote computing system. The "raw" data that is used by perception subsystem 602a may include other types of data as well.

Advantageously, by fusing together multiple different types of raw data (e.g., both 2D sensor data and 3D sensor data), perception subsystem 602a is able to leverage the relative strengths of these different types of raw data in a way that may produce a more accurate and precise representation of the surrounding environment being perceived by vehicle 600.

Further, the function of deriving the representation of the surrounding environment perceived by vehicle 600 using the raw data may include various aspects. For instance, one aspect of deriving the representation of the surrounding environment perceived by vehicle 600 using the raw data may involve determining a current state of vehicle 600 itself, such as a current position, a current orientation, a current velocity, and/or a current acceleration, among other possibilities. In this respect, perception subsystem 602a may employ a localization technique such as SLAM to assist in the determination of the vehicle's current position and/or orientation in relation to the surrounding map data. By localizing the vehicle 600 in relation to the surrounding map data in this way, the perception subsystem 602a may access encoded knowledge about the surrounding environment that is contained within the map data, but which otherwise might not be detectable by the sensor system 601 (e.g., prior agent trajectories).

Alternatively, it is possible that on-board computing system 602 may run a separate localization service that determines, based on the captured sensor data, position and/or orientation values for vehicle 600 in relation to the associated map data, in which case these position and/or orientation values may serve as another input to perception subsystem 602a.

Another aspect of deriving the representation of the surrounding environment perceived by vehicle 600 using the raw data may involve detecting objects within the vehicle's surrounding environment, which may result in the determination of class labels, bounding boxes, or the like for each detected object. In this respect, the particular classes of objects that are detected by perception subsystem 602a (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 602a may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 600 using the raw data may involve determining a current state of each object detected in the vehicle's surrounding environment, such as a current position (which could be reflected in terms of coordinates and/or in terms of a distance and direction from vehicle 600), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 600, among other possibilities.

The function of deriving the representation of the surrounding environment perceived by vehicle 600 using the raw data may include other aspects as well.

Further yet, the derived representation of the surrounding environment perceived by vehicle 600 may incorporate various different information about the surrounding environment perceived by vehicle 600, examples of which may include (i) a respective set of information for each object detected in the vehicle's surrounding, such as a class label, a bounding box, and/or state information for each detected object, (ii) a set of information for vehicle 600 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 600 may incorporate other types of information about the surrounding environment perceived by vehicle 600 as well.

Still further, the derived representation of the surrounding environment perceived by vehicle 600 may be embodied in various forms. For instance, as one possibility, the derived representation of the surrounding environment perceived by vehicle 600 may be embodied in the form of a data structure that represents the surrounding environment perceived by vehicle 600, which may comprise respective data arrays (e.g., vectors) that contain information about the objects detected in the surrounding environment perceived by vehicle 600, a data array that contains information about vehicle 600, and/or one or more data arrays that contain other semantic information about the surrounding environment. Such a data structure may be referred to as a "parameter-based encoding."

As another possibility, the derived representation of the surrounding environment perceived by vehicle 600 may be embodied in the form of a rasterized image that represents the surrounding environment perceived by vehicle 600 in the form of colored pixels. In this respect, the rasterized image may represent the surrounding environment perceived by vehicle 600 from various different visual perspectives, examples of which may include a "top down" view and a "bird's eye" view of the surrounding environment, among other possibilities. Further, in the rasterized image, the objects detected in the surrounding environment of vehicle 600 (and perhaps vehicle 600 itself) could be shown as color-coded bitmasks and/or bounding boxes, among other possibilities.

The derived representation of the surrounding environment perceived by vehicle 600 may be embodied in other forms as well.

As shown, perception subsystem 602a may pass its derived representation of the vehicle's surrounding environment to prediction subsystem 602b. In turn, prediction subsystem 602b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 600 to anticipate how the real-world objects in its surrounding environment are likely to behave in the future and then plan its behavior in a way that accounts for this future behavior.

Prediction subsystem 602b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 602b is configured to predict this type of future state information for a detected object at multiple future times, such a time sequence of future states may collectively define a predicted future trajectory of the detected object. Further, in some embodiments, prediction subsystem 602b could be configured to predict multiple different possibilities of future states for a detected object (e.g., by predicting the 3 most-likely future trajectories of the detected object). Prediction subsystem 602b may be configured to predict other aspects of a detected object's future behavior as well.

In practice, prediction subsystem 602b may predict a future state of an object detected in the vehicle's surrounding environment in various manners, which may depend in part on the type of detected object. For instance, as one possibility, prediction subsystem 602b may predict the future state of a detected object using a data science model that is configured to (i) receive input data that includes one or more derived representations output by perception subsystem 602a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 602, although it is possible that a future-state model could be created by on-board computing system 602 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 602b could predict the future state of a detected object in other manners as well. For instance, for detected objects that have been classified by perception subsystem 602a as belonging to certain classes of static objects (e.g., roads, curbs, lane markings, etc.), which generally do not have the potential to move, prediction subsystem 602b may rely on this classification as a basis for predicting that the future state of the detected object will remain the same at each of the one or more future times (in which case the state-prediction model may not be used for such detected objects). However, it should be understood that detected objects may be classified by perception subsystem 602a as belonging to other classes of static objects that have the potential to change state despite not having the potential to move, in which case prediction subsystem 602b may still use a future-state model to predict the future state of such detected objects. One example of a static object class that falls within this category is a traffic light, which generally does not have the potential to move but may nevertheless have the potential to change states (e.g. between green, yellow, and red) while being perceived by vehicle 600.

After predicting the future state of each object detected in the surrounding environment perceived by vehicle 600 at one or more future times, prediction subsystem 602b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 602b may pass the one or more derived representations of the vehicle's surrounding environment to planning subsystem 602c. In turn, planning subsystem 602c may be configured to use the one or more derived representations of the vehicle's surrounding environment (and perhaps other data) to derive a behavior plan for vehicle 600, which defines the desired driving behavior of vehicle 600 for some future period of time (e.g., the next 5 seconds).

The behavior plan that is derived for vehicle 600 may take various forms. For instance, as one possibility, the derived behavior plan for vehicle 600 may comprise a planned trajectory for vehicle 600 that specifies a planned state of vehicle 600 at each of one or more future times (e.g., each second over the next 5 seconds), where the planned state for each future time may include a planned position of vehicle 600 at the future time, a planned orientation of vehicle 600 at the future time, a planned velocity of vehicle 600 at the future time, and/or a planned acceleration of vehicle 600 (whether positive or negative) at the future time, among other possible types of state information. As another possibility, the derived behavior plan for vehicle 600 may comprise one or more planned actions that are to be performed by vehicle 600 during the future window of time, where each planned action is defined in terms of the type of action to be performed by vehicle 600 and a time and/or location at which vehicle 600 is to perform the action, among other possibilities. The derived behavior plan for vehicle 600 may define other planned aspects of the vehicle's behavior as well.

Further, in practice, planning subsystem 602c may derive the behavior plan for vehicle 600 in various manners. For instance, as one possibility, planning subsystem 602c may be configured to derive the behavior plan for vehicle 600 by (i) deriving a plurality of different "candidate" behavior plans for vehicle 600 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 600. Planning subsystem 602c may derive the behavior plan for vehicle 600 in various other manners as well.

After deriving the behavior plan for vehicle 600, planning subsystem 602c may pass data indicating the derived behavior plan to control subsystem 602d. In turn, control subsystem 602d may be configured to transform the behavior plan for vehicle 600 into one or more control signals (e.g., a set of one or more command messages) for causing vehicle 600 to execute the behavior plan. For instance, based on the behavior plan for vehicle 600, control subsystem 602d may be configured to generate control signals for causing vehicle 600 to adjust its steering in a specified manner, accelerate in a specified manner, and/or brake in a specified manner, among other possibilities.

As shown, control subsystem 602d may then pass the one or more control signals for causing vehicle 600 to execute the behavior plan to vehicle-interface subsystem 602e. In turn, vehicle-interface subsystem 602e may be configured to translate the one or more control signals into a format that can be interpreted and executed by components of vehicle-control system 603. For example, vehicle-interface subsystem 602e may be configured to translate the one or more control signals into one or more control messages are defined according to a particular format or standard, such as a CAN bus standard and/or some other format or standard that is used by components of vehicle-control system 603.

In turn, vehicle-interface subsystem 602e may be configured to direct the one or more control signals to the appropriate control components of vehicle-control system 603. For instance, as shown, vehicle-control system 603 may include a plurality of actuators that are each configured to control a respective aspect of the vehicle's physical operation, such as a steering actuator 603a that is configured to control the vehicle components responsible for steering (not shown), an acceleration actuator 603b that is configured to control the vehicle components responsible for acceleration such as a throttle (not shown), and a braking actuator 603c that is configured to control the vehicle components responsible for braking (not shown), among other possibilities. In such an arrangement, vehicle-interface subsystem 602e of on-board computing system 602 may be configured to direct steering-related control signals to steering actuator 603a, acceleration-related control signals to acceleration actuator 603b, and braking-related control signals to braking actuator 603c. However, it should be understood that the control components of vehicle-control system 603 may take various other forms as well.

Notably, the subsystems of on-board computing system 602 may be configured to perform the above functions in a repeated manner, such as many times per second, which may enable vehicle 600 to continually update both its understanding of the surrounding environment and its planned behavior within that surrounding environment.

Although not specifically shown, it should be understood that vehicle 600 includes various other systems and components as well, including but not limited to a propulsion system that is responsible for creating the force that leads to the physical movement of vehicle 600.

Figure 7:
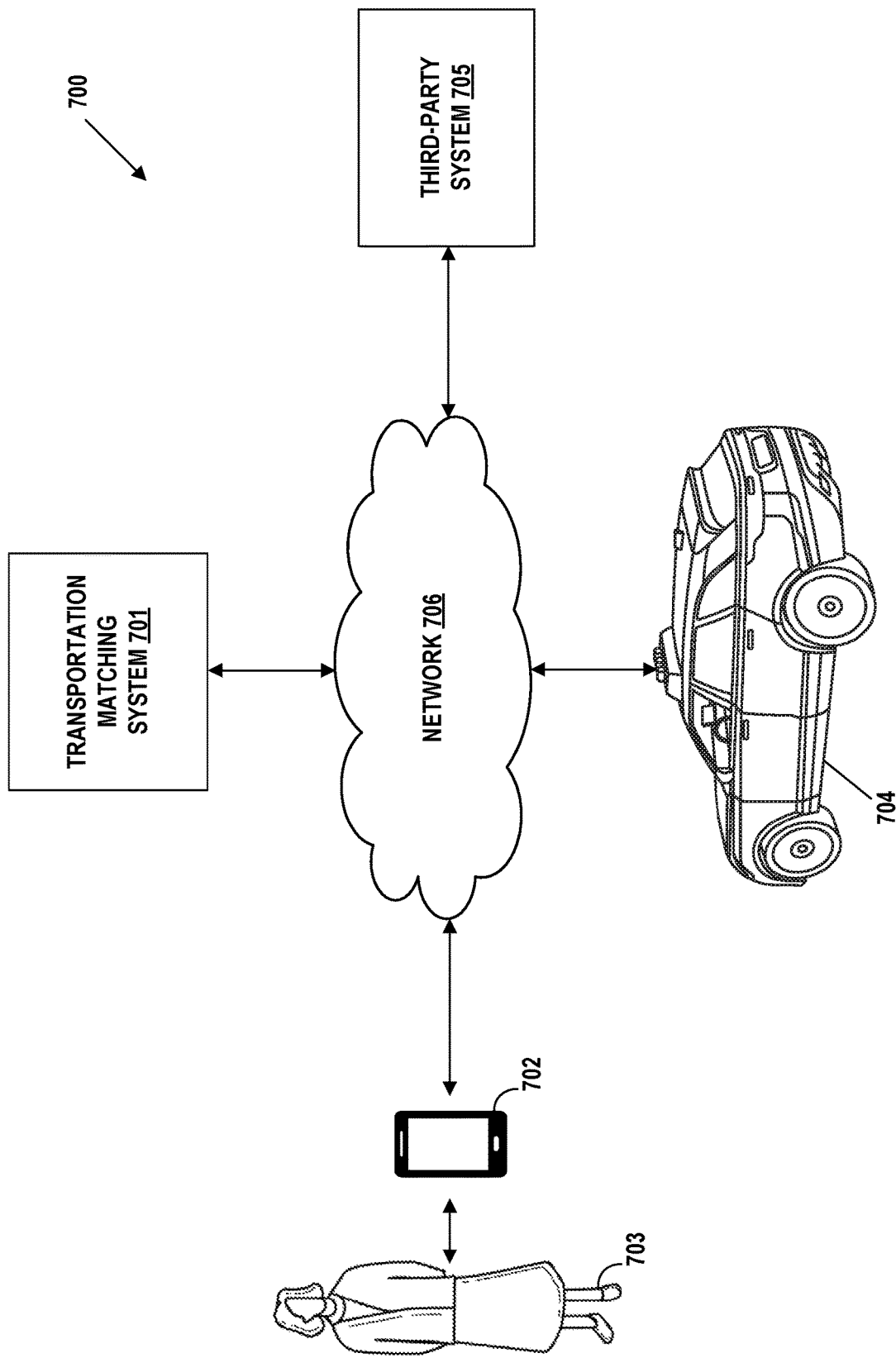
FIG. 7 is a simplified block diagram that illustrates one example of a transportation-matching platform.

Turning now to FIG. 7, a simplified block diagram is provided to illustrate one example of a transportation-matching platform 700 that functions to match individuals interested in obtaining transportation from one location to another with vehicles that can provide such transportation. As shown, transportation-matching platform 700 may include at its core a transportation-matching system 701, which may be communicatively coupled via a communication network 706 to (i) a plurality of client stations of transportation requestors, of which client station 702 of transportation requestor 703 is shown as one representative example, (ii) a plurality of vehicles that are capable of providing the requested transportation, of which vehicle 704 is shown as one representative example, and (iii) a plurality of third-party systems that are capable of providing respective sub services that facilitate the platform's transportation matching, of which third-party system 705 is shown as one representative example.

Broadly speaking, transportation-matching system 701 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 701 may comprise computing infrastructure of a public, private, and/or hybrid cloud (e.g., computing and/or storage clusters). In this respect, the entity that owns and operates transportation-matching system 701 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 701 may comprise one or more dedicated servers. Other implementations of transportation-matching system 701 are possible as well.

As noted, transportation-matching system 701 may be configured to perform functions related to managing and facilitating transportation matching, which may take various forms. For instance, as one possibility, transportation-matching system 701 may be configured to receive transportation requests from client stations of transportation requestors (e.g., client station 702 of transportation requestor 703) and then fulfill such transportation requests by dispatching suitable vehicles, which may include vehicle 704. In this respect, a transportation request from client station 702 of transportation requestor 703 may include various types of information.

For example, a transportation request from client station 702 of transportation requestor 703 may include specified pick-up and drop-off locations for the transportation. As another example, a transportation request from client station 702 of transportation requestor 703 may include an identifier that identifies transportation requestor 703 in transportation-matching system 701, which may be used by transportation-matching system 701 to access information about transportation requestor 703 (e.g., profile information) that is stored in one or more data stores of transportation-matching system 701 (e.g., a relational database system), in accordance with the transportation requestor's privacy settings. This transportation requestor information may take various forms, examples of which include profile information about transportation requestor 703. As yet another example, a transportation request from client station 702 of transportation requestor 703 may include preferences information for transportation requestor 703, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 701 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 701 receives a request for transportation from San Francisco International Airport (SFO) to Palo Alto, California, system 701 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 701. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 701.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 701 could be configured to predict and provide ride suggestions in response to a transportation request. For instance, transportation-matching system 701 may be configured to apply one or more machine-learning techniques to such historical data in order to "train" a machine-learning model to predict ride suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 701 may only be capable of storing and later accessing historical data for a given transportation requestor if the given transportation requestor previously decided to "opt-in" to having such information stored. In this respect, transportation-matching system 701 may maintain respective privacy settings for each transportation requestor that uses transportation-matching platform 700 and operate in accordance with these settings. For instance, if a given transportation requestor did not opt-in to having his or her information stored, then transportation-matching system 701 may forgo performing any of the above-mentioned functions based on historical data. Other possibilities also exist.

Transportation-matching system 701 may be configured to perform various other functions related to managing and facilitating transportation matching as well.

Referring again to FIG. 7, client station 702 of transportation requestor 703 may generally comprise any computing device that is configured to facilitate interaction between transportation requestor 703 and transportation-matching system 701. For instance, client station 702 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 703 and transportation-matching system 701 (which may be embodied in the form of a software application, such as a mobile application, web application, or the like). In this respect, the interaction that may take place between transportation requestor 703 and transportation-matching system 701 may take various forms, representative examples of which may include requests by transportation requestor 703 for new transportation events, confirmations by transportation-matching system 701 that transportation requestor 703 has been matched with a vehicle (e.g., vehicle 704), and updates by transportation-matching system 701 regarding the progress of the transportation event, among other possibilities.

In turn, vehicle 704 may generally comprise any kind of vehicle that can provide transportation, and in one example, may take the form of vehicle 600 described above. Further, the functionality carried out by vehicle 704 as part of transportation-matching platform 700 may take various forms, representative examples of which may include receiving a request from transportation-matching system 701 to handle a new transportation event, driving to a specified pickup location for a transportation event, driving from a specified pickup location to a specified drop-off location for a transportation event, and providing updates regarding the progress of a transportation event to transportation-matching system 701, among other possibilities.

Generally speaking, third-party system 705 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 701.

Moreover, third-party system 705 may be configured to perform functions related to various subservices. For instance, as one possibility, third-party system 705 may be configured to monitor traffic conditions and provide traffic data to transportation-matching system 701 and/or vehicle 704, which may be used for a variety of purposes. For example, transportation-matching system 701 may use such data to facilitate fulfilling transportation requests in the first instance and/or updating the progress of initiated transportation events, and vehicle 704 may use such data to facilitate updating certain predictions regarding perceived agents and/or the vehicle's behavior plan, among other possibilities.

As another possibility, third-party system 705 may be configured to monitor weather conditions and provide weather data to transportation-matching system 701 and/or vehicle 704, which may be used for a variety of purposes. For example, transportation-matching system 701 may use such data to facilitate fulfilling transportation requests in the first instance and/or updating the progress of initiated transportation events, and vehicle 704 may use such data to facilitate updating certain predictions regarding perceived agents and/or the vehicle's behavior plan, among other possibilities.

As yet another possibility, third-party system 705 may be configured to authorize and process electronic payments for transportation requests. For example, after transportation requestor 703 submits a request for a new transportation event via client station 702, third-party system 705 may be configured to confirm that an electronic payment method for transportation requestor 703 is valid and authorized and then inform transportation-matching system 701 of this confirmation, which may cause transportation-matching system 701 to dispatch vehicle 704 to pick up transportation requestor 703. After receiving a notification that the transportation event is complete, third-party system 705 may then charge the authorized electronic payment method for transportation requestor 703 according to the fare for the transportation event. Other possibilities also exist.

Third-party system 705 may be configured to perform various other functions related to sub services that facilitate the platform's transportation matching as well. It should be understood that, although certain functions were discussed as being performed by third-party system 705, some or all of these functions may instead be performed by transportation-matching system 701.

As discussed above, transportation-matching system 701 may be communicatively coupled to client station 702, vehicle 704, and third-party system 705 via communication network 706, which may take various forms. For instance, at a high level, communication network 706 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 7 may take other forms as well, including the possibility that such communication paths include communication links and/or intermediate devices that are not shown.

In the foregoing arrangement, client station 702, vehicle 704, and/or third-party system 705 may also be capable of indirectly communicating with one another via transportation-matching system 701. Additionally, although not shown, it is possible that client station 702, vehicle 704, and/or third-party system 705 may be configured to communicate directly with one another as well (e.g., via a short-range wireless communication path or the like). Further, vehicle 704 may also include a user-interface system that may facilitate direct interaction between transportation requestor 703 and vehicle 704 once transportation requestor 703 enters vehicle 704 and the transportation event begins.

It should be understood that transportation-matching platform 700 may include various other entities and take various other forms as well.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
maintaining a map that is representative of a real-world environment, the map comprising a plurality of layers, wherein each layer of the map is encoded with a different type of map data;
obtaining sensor data that is indicative of a given area of the real-world environment;
based on an evaluation of (i) the obtained sensor data and (ii) map data corresponding to the given area, detecting that a change has occurred in the given area involving an addition of a new semantic feature to the given area of the real-world environment;
based on the obtained sensor data, deriving information about the detected change to the given area, wherein the derived information about the detected change to the given area includes at least a type of the detected change and a location of the detected change;
based on the derived information about the detected change, determining that multiple different layers of the map are impacted by the detected change, wherein the multiple different layers comprise a semantic map layer that is encoded with semantic map data and at least one of a geometric map layer or a priors layer; and
effecting an update to the multiple different layers of the map based on the derived information about the detected change.

2. The computer-implemented method of claim 1, further comprising:
after effecting the update to the multiple different layers of the map based on the derived information about the detected change, obtaining additional sensor data that indicates that the detected change has been removed from the given area; and
based on an evaluation of at least the additional obtained sensor data that indicates that the detected change has been removed from the given area, reverting the update to the multiple different layers of the map.

3. The computer-implemented method of claim 1, further comprising:
after detecting that the detected change has occurred in the given area, requesting additional sensor data that is indicative of the given area; and
based on requesting the additional sensor data, obtaining the additional sensor data, wherein effecting the update to the multiple different layers of the map is based on the obtained additional sensor data.

4. The computer-implemented method of claim 3, wherein requesting additional sensor data comprises causing a sensor-equipped vehicle to traverse the given area, and wherein obtaining the additional sensor data comprises receiving the additional sensor data from the sensor-equipped vehicle.

5. The computer-implemented method of claim 1, wherein the obtained sensor data comprises 2D image data and the map data corresponding to the given area comprises 2D reference images of the given area, and wherein the evaluation of (i) the obtained sensor data and (ii) the map data comprises:
localizing the 2D image data in relation to the 2D reference images; and
determining a delta between the 2D image data and the 2D reference images.

6. The computer-implemented method of claim 1, wherein obtaining sensor data that is indicative of the given area of the real-world environment comprises obtaining respective sensor data sets collected by two or more vehicles in the given area of the real-world environment, the method further comprising:
detecting the detected change in two or more of the respective sensor data sets;
based on detecting the detected change in two or more of the respective sensor data sets, determining a confidence level associated with the detected change; and
wherein effecting the update to the multiple different layers of the map is based on the determined confidence level exceeding a predetermined threshold.

7. The computer-implemented method of claim 1, wherein determining that the multiple different layers of the map are impacted by the detected change comprises:
determining a primary layer of the map to be updated based on the detected change; and
determining one or more additional layers of the map to which the update to the primary layer is to be propagated.

8. The computer-implemented method of claim 1, wherein detecting that the change has occurred in the given area comprises:
based on a snapping error that has occurred in the given area, detecting that the change has occurred in the given area.

9. A non-transitory computer-readable medium comprising program instructions stored thereon that are executable to cause a computing system to:
maintain a map that is representative of a real-world environment, the map comprising a plurality of layers, wherein each layer of the map is encoded with a different type of map data;
obtain sensor data that is indicative of a given area of the real-world environment;
based on an evaluation of (i) the obtained sensor data and (ii) map data corresponding to the given area, detect that a change has occurred in the given area involving an addition of a new semantic feature to the given area of the real-world environment;
based on the obtained sensor data, derive information about the detected change to the given area, wherein the derived information about the detected change that has occurred in the given area includes at least a type of the detected change and a location of the detected change;
based on the derived information about the detected change, determine that multiple different layers of the map are impacted by the detected change, wherein the multiple different layers comprise a semantic map layer that is encoded with semantic map data and at least one of a geometric map layer or a priors layer; and
effect an update to the multiple different layers of the map based on the derived information about the detected change.

10. The computer-readable medium of claim 9, wherein the computer-readable medium further comprises program instructions stored thereon that are executable to cause the computing system to:
after effecting the update to the multiple different layers of the map based on the derived information about the detected change, obtain additional sensor data that indicates that the detected change has been removed from the given area; and
based on an evaluation of at least the additional obtained sensor data that indicates that the detected change has been removed from the given area, revert the update to the multiple different layers of the map.

11. The computer-readable medium of claim 9, wherein the computer-readable medium further comprises program instructions stored thereon that are executable to cause the computing system to:
  after detecting that the detected change has occurred in the given area, request additional sensor data that is indicative of the given area; and
  based on requesting the additional sensor data, obtain the additional sensor data, wherein effecting the update to the multiple different layers of the map is based on the obtained additional sensor data.

12. The computer-readable medium of claim 11, wherein requesting additional sensor data comprises causing a sensor-equipped vehicle to traverse the given area, and wherein obtaining the additional sensor data comprises receiving the additional sensor data from the sensor-equipped vehicle.

13. The computer-readable medium of claim 9, wherein the obtained sensor data comprises 2D image data and the map data corresponding to the given area comprises 2D reference images of the given area, and wherein the evaluation of (i) the obtained sensor data and (ii) the map data comprises:
  localizing the 2D image data in relation to the 2D reference images; and
  determining a delta between the 2D image data and the 2D reference images.

14. The computer-readable medium of claim 9, wherein obtaining sensor data that is indicative of the given area of the real-world environment comprises obtaining respective sensor data sets collected by two or more vehicles in the given area of the real-world environment, and wherein the computer-readable medium further comprises program instructions stored thereon that are executable to cause the computing system to:
  detect the detected change in two or more of the respective sensor data sets;
  based on detecting the detected change in two or more of the respective sensor data sets, determine a confidence level associated with the detected change; and
  wherein effecting the update to the multiple different layers of the map is based on the determined confidence level exceeding a predetermined threshold.

15. The computer-readable medium of claim 9, wherein the program instructions that are executable to cause the computing system to determine that the multiple different layers of the map are impacted by the detected change comprise program instructions that are executable to cause the computing system to:
  determine a primary layer of the map to be updated based on the detected change; and
  determine one or more additional layers of the map to which the update to the primary layer is to be propagated.

16. The computer-readable medium of claim 9, wherein the program instructions that are executable to cause the computing system to detect that the change has occurred in the given area comprise program instructions that are executable to cause the computing system to:
  based on a snapping error that has occurred in the given area, detect that the change has occurred in the given area.

17. A computing system comprising:
  at least one processor;
  a non-transitory computer-readable medium; and
  program instructions stored on the non-transitory computer-readable medium that are executable by the at least one processor such that the computing system is capable of:
    maintaining a map that is representative of a real-world environment, the map comprising a plurality of layers, wherein each layer of the map is encoded with a different type of map data;
    obtaining sensor data that is indicative of a given area of the real-world environment;
    based on an evaluation of (i) the obtained sensor data and (ii) map data corresponding to the given area, detecting that a change has occurred in the given area involving an addition of a new semantic feature to the given area of the real-world environment;
    based on the obtained sensor data, deriving information about the detected change to the given area, wherein the derived information about the detected change to the given area includes at least a type of the detected change and a location of the detected change;
    based on the derived information about the detected change, determining that multiple different layers of the map are impacted by the detected change, wherein the multiple different layers comprise a semantic map layer that is encoded with semantic map data and at least one of a geometric map layer or a priors layer; and
    effecting an update to the multiple different layers of the map based on the derived information about the detected change.

18. The computing system of claim 17, wherein the program instructions that are executable by the at least one processor such that the computing system is capable of determining that the multiple different layers of the map are impacted by the detected change comprise program instructions that are executable by the at least one processor such that the computing system is capable of:
  determining a primary layer of the map to be updated based on the detected change; and
  determining one or more additional layers of the map to which the update to the primary layer is to be propagated.

* * * * *